(12) United States Patent
Backlund

(10) Patent No.: US 10,935,154 B2
(45) Date of Patent: Mar. 2, 2021

(54) KEYED VALVE BOX

(71) Applicant: Torqbuddy LLC, Woodbury, MN (US)

(72) Inventor: Jeffrey Karl Backlund, Woodbury, MN (US)

(73) Assignee: Torqbuddy LLC, Woodbury, MN (US)

( * ) Notice: Subject to any disclaimer, the term of this patent is extended or adjusted under 35 U.S.C. 154(b) by 90 days.

(21) Appl. No.: 15/462,198

(22) Filed: Mar. 17, 2017

(65) Prior Publication Data

US 2017/0268686 A1 Sep. 21, 2017

Related U.S. Application Data

(60) Provisional application No. 62/390,068, filed on Mar. 18, 2016.

(51) Int. Cl.
| | |
|---|---|
| *F16K 31/04* | (2006.01) |
| *E02D 29/12* | (2006.01) |

(Continued)

(52) U.S. Cl.
CPC ............ *F16K 31/041* (2013.01); *E02D 29/12* (2013.01); *E03B 9/10* (2013.01); *F16K 27/12* (2013.01); *F16K 31/46* (2013.01); *F16K 31/607* (2013.01)

(58) Field of Classification Search
CPC ...... F16K 31/014; F16K 31/46; F16K 31/607; F16K 31/445; F16K 27/12;
(Continued)

(56) References Cited

U.S. PATENT DOCUMENTS

| 358,515 A | * | 3/1887 | Warner | ................... F16K 31/46 |
| | | | | 137/369 |
| 2,511,209 A | * | 6/1950 | Bryan | ....................... E03B 9/10 |
| | | | | 137/369 |

(Continued)

FOREIGN PATENT DOCUMENTS

| CH | 692709 | 9/2002 |
| EP | 2474671 | 7/2012 |

(Continued)

OTHER PUBLICATIONS

Translation of FR 2663006. (Year: 2019).*
(Continued)

*Primary Examiner* — Kelsey E Cary
(74) *Attorney, Agent, or Firm* — Jeffrey D. Shewchuk; Shewchuk IP Services, LLC

(57) ABSTRACT

A valve box for accessing a utility valve, the valve box having a box housing with an inner surface and an outer surface. The outer surface may have a plurality of fins, and the inner surface may have a plurality of keyways configured to receive a plurality of keys. The inner surface may additionally have threading. The box housing may have an access opening in some embodiments, and the valve box may include a threaded valve box cover configured to be arranged over the access opening. In some embodiments, the box housing may have a plurality of modular rings. A valve box tool may have a driving portion, a valve box engaging portion, and a stem portion. The valve box engaging portion may have a plurality of keys configured to engage the plurality of keyways. The stem portion may be configured to extend between the driving portion and a valve.

16 Claims, 38 Drawing Sheets

(51) Int. Cl.
*F16K 27/12* (2006.01)
*E03B 9/10* (2006.01)
*F16K 31/46* (2006.01)
*F16K 31/60* (2006.01)

(58) Field of Classification Search
CPC ......... Y10T 137/6988; Y10T 137/7006; Y10T 137/7021; E02D 29/12; E03B 9/10
USPC ........ 251/291, 293; 137/272, 291, 293, 294, 137/296, 358, 362, 367, 371, 368, 369
See application file for complete search history.

(56) References Cited

U.S. PATENT DOCUMENTS

| | | | |
|---|---|---|---|
| 2,695,449 A | 11/1954 | Chauvin | |
| 3,087,546 A | 4/1963 | Woolley | |
| 3,216,295 A | 11/1965 | Gill | |
| 3,658,086 A * | 4/1972 | Hart | F16K 27/006 137/368 |
| 3,939,561 A | 2/1976 | Nichols | |
| 4,177,559 A | 12/1979 | Anderson | |
| 4,307,512 A | 12/1981 | Phillips | |
| 4,703,802 A | 11/1987 | Bryan et al. | |
| 4,915,125 A * | 4/1990 | Lester | F16K 31/46 137/368 |
| 5,327,925 A * | 7/1994 | Ortel | E03B 9/10 137/15.08 |
| 5,511,573 A | 4/1996 | Corte | |
| 5,685,078 A | 11/1997 | Obst et al. | |
| 5,815,926 A | 10/1998 | Ekern | |
| 5,884,668 A | 3/1999 | Larkin | |
| 5,924,489 A | 7/1999 | Hatcher | |
| 2013/0336723 A1* | 12/2013 | McKinney | E02D 29/12 405/129.55 |
| 2014/0157963 A1 | 6/2014 | Von Wirth et al. | |
| 2014/0216571 A1* | 8/2014 | Roell | F16L 55/1108 137/363 |

FOREIGN PATENT DOCUMENTS

| | | |
|---|---|---|
| FR | 2663006 | 12/1991 |
| FR | 2705981 | 12/1994 |

OTHER PUBLICATIONS

Translation of FR 2705981 (Year: 2019).*
International Search Report and Written Opinion for PCT Application No. PCT/US2017/022967 dated Oct. 25, 2017 (20 pages).

* cited by examiner

KEYED VALVE BOX

CROSS-REFERENCE TO RELATED APPLICATIONS

The present application claims priority to U.S. Provisional Patent Application No. 62/390,068, filed on Mar. 18, 2016, entitled Valve Box Top with Tooled Features, the content of which is hereby incorporated by reference herein in its entirety.

FIELD OF THE INVENTION

The present disclosure relates to valve boxes for accessing utility line valves. Particularly, the present disclosure relates to valve boxes for accessing below-ground utility lines. More particularly, the present disclosure relates to a valve box against which a tool may be leveraged in order to operate a valve.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

City valve boxes, such as water, gas, sewer, or other utility valve boxes are often located on city streets, causeways, and sidewalks to provide access to valves. Such locations provide relatively easy access to the valve boxes for the city and provide for minimal impediment to city residents when under maintenance or repair. In many cases, a worker may open the valve box to access a valve, such as a water, gas, or sewer valve, below the ground surface. In some cases, valves may stick and generally be difficult to operate due to temperature, moisture, time between operations, or other causes. Some valve operations may thus require relatively high effort and time, which may lead to long road closure times or other closures, and extended risk to workers on or near roadways.

In some climates, the street surface or other surface on which the valve box is arranged may experience shifting due to frost heave, which can cause the valve box to become exposed above the surface of the street or other surface. The exposed valve box may be hazardous and/or may become damaged and in need of repair due to traffic, snow plowing, or other activities. Repair of damaged valve boxes often includes digging up the surrounding area, removing and replacing the valve box, and filling in around the valve box with pavement, concrete, or other materials. Valve box repairs may thus require relatively high effort and time, which may lead to long road closure times or other closures, and extended risk to workers on or near roadways.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a valve box for accessing a utility valve. The valve box may have a box housing configured for engaging a riser extending from the utility valve, the box housing having an inner surface and an outer surface. The outer surface may have a plurality of fins arranged thereon, and the inner surface may have a plurality of keyways arranged thereon and configured to receive a plurality of keys from a valve box tool. In some embodiments, the inner surface may additionally have threading. In some embodiments, the valve box may have at least four fins. Moreover, the valve box may have at least four keyways in some embodiments. The box housing may have an access opening in some embodiments, and the valve box may include a valve box cover configured to be arranged over the access opening. The valve box cover may have threading for engaging with the valve box. In some embodiments, the valve box cover may have an operating nut for engaging with a tool. In some embodiments, the box housing may have a plurality of modular rings.

The present disclosure, in one or more embodiments, additionally relates to a valve box tool for operating a utility valve accessible via a valve box. The valve box tool may have a driving portion having a motor, a valve box engaging portion configured to engage the valve box, and a stem portion configured to extend between the driving portion and the utility valve. In some embodiments, the valve box engaging portion may have a plurality of keys configured to engage a plurality of keyways arranged on an inner surface of the valve box. In some embodiments, the driving portion may have a handle for a user. In some embodiments, the valve box tool may have four keys, and the valve box may have four keyways. Moreover, in some embodiments, the valve box tool may be permanently or semi-permanently arranged within the valve box. The tool may be operated remotely in some embodiments.

The present disclosure, in one or more embodiments, additionally relates to a method of actuating a utility valve on a utility line. The method may include removing a valve box cover from a valve box, the valve box having a plurality of keyways arranged on an inner surface and configured to receive a plurality of keys of a valve box tool. The method may further include positioning a valve box tool having a plurality of keys arranged on an outer surface into the valve box by aligning the keys with the keyways. The method may include coupling the valve box tool to the utility valve, and further driving the valve box tool to actuate the valve, wherein resistant force from the valve is directed to the valve box. In some embodiments, coupling the valve box tool to the utility valve may include extending a stem portion of the valve box tool through the valve box to reach the utility valve. The stem portion may extend through a riser coupled to the valve box in some embodiments. In some embodiments, the method may additionally include moving to a next valve box location for a next utility valve on the utility line. The valve box may have a plurality of fins arranged on an outer surface in some embodiments.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to a valve box for accessing and working a valve, such as a water, gas, or sewer line valve or other utility valve. For example, the valve box may be arranged to provide above-ground access to a below-ground utility valve. In some embodiments, a valve box of the present disclosure may lessen the burden of valve operation by providing leverage against which the valve may be rotated. For example, a valve box of the present disclosure may have a plurality of keyways arranged on an inner surface thereof and configured to receive a plurality of keys arranged on a valve box tool. As the valve box tool is rotated to apply torque to the valve, the keys arranged in the keyways may provide leverage for turning a resistant valve. That is, the tool may engage the box via the keys and keyways and turn a valve opener relative to the box. Additionally, the valve box may have a plurality of fins arranged on an outer surface thereof and configured for stabilizing and/or resisting rotation of the valve box with respect to the ground surface.

Figure 1:
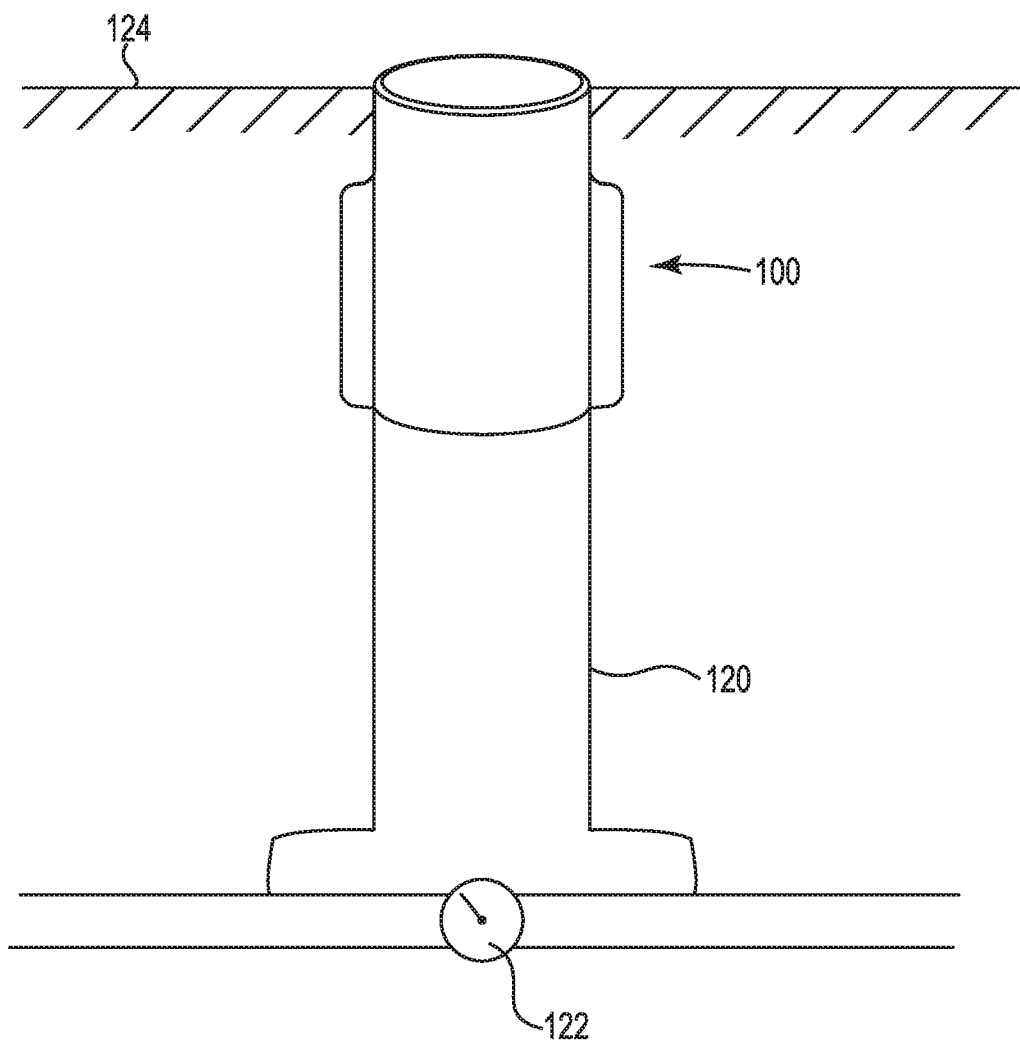
FIG. 1 is a side view of a valve box of the present disclosure arranged with respect to a utility valve, according to one or more embodiments.
Figure 2:
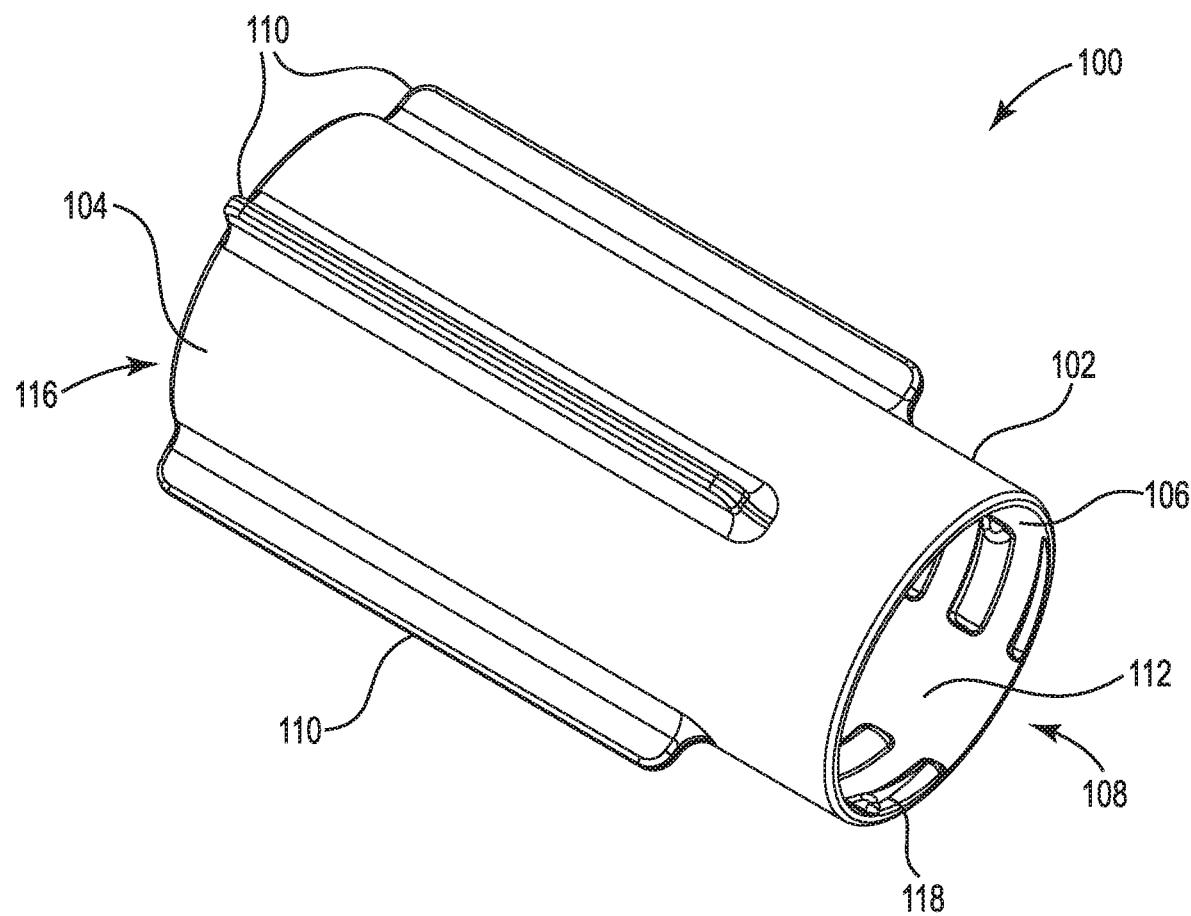
FIG. 2 is a perspective view of a valve box of the present disclosure, according to one or more embodiments.
Figure 3:
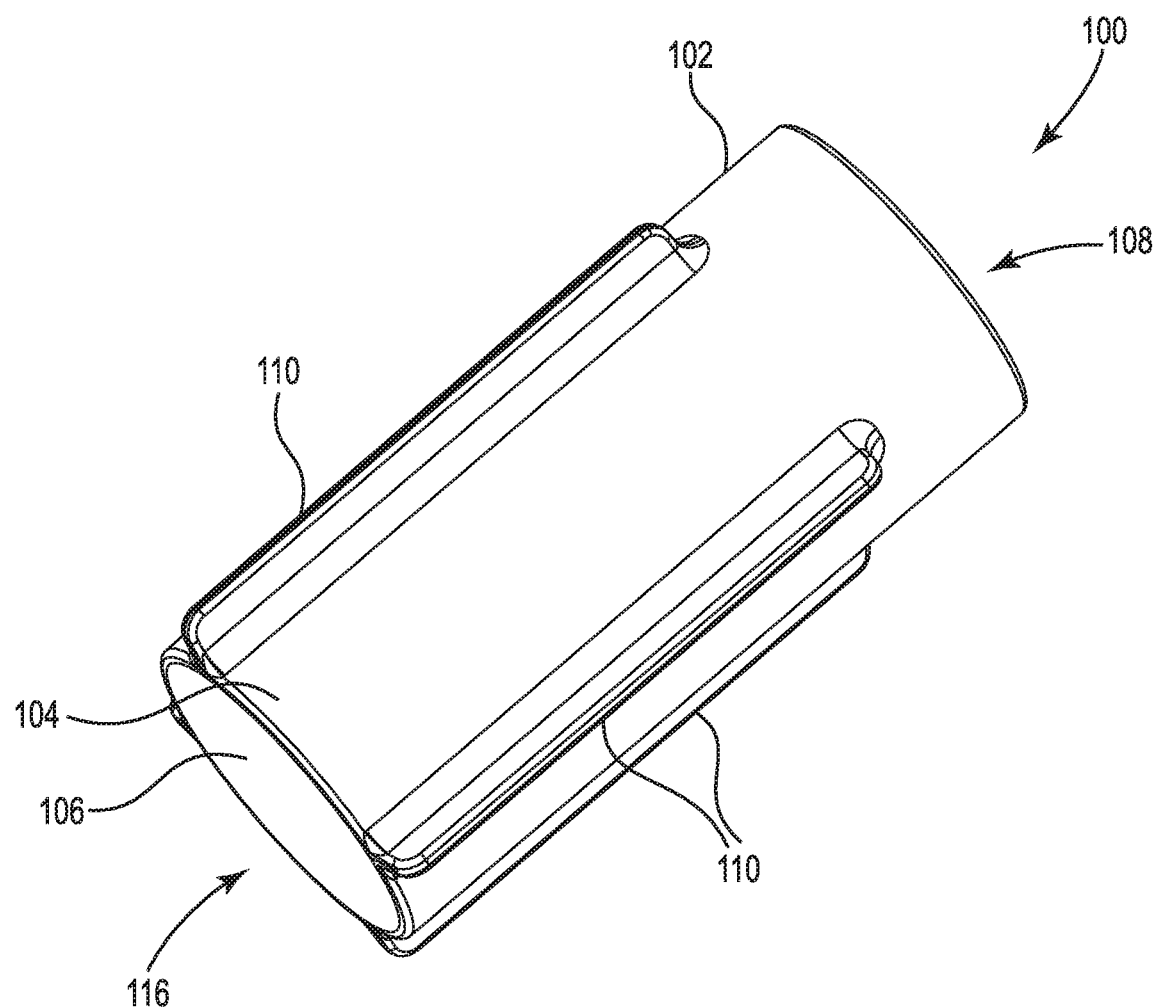
FIG. 3 is a perspective view of a valve box of the present disclosure, according to one or more embodiments.
Figure 4:
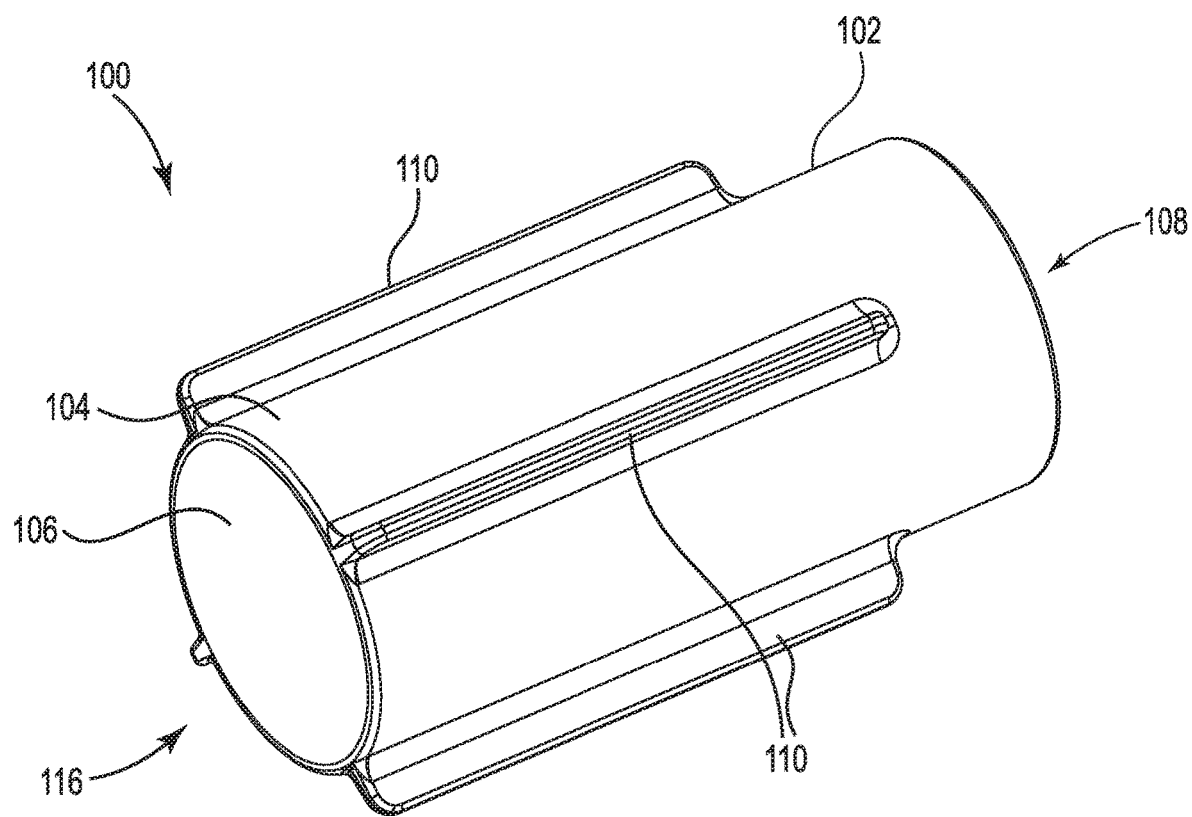
FIG. 4 is a perspective view of a valve box of the present disclosure, according to one or more embodiments.

Turning now to FIG. 1, a valve box 100 of the present disclosure is shown. The valve box 100 may be configured to couple to or generally be arranged in physical communication with a riser 120, lower valve box, conduit, piping, or other components containing or leading to a valve 122, such as a water valve. The valve box 100 may be configured to be arranged such that the valve box or a portion thereof may be beneath a ground surface 124, with an opening arranged at or above ground surface. The valve box 100 may provide above-ground access to a below-ground valve 122, such as a water valve on a water line. Turning to FIG. 2, the valve box 100 may generally include a box housing 102 having an outer surface 104, an inner surface 106, and a valve access opening 108. One or more fins 110 may be arranged on the exterior surface 104. The inner surface 102 may have one or more keyways 112. FIGS. 3-7 show additional views of the valve box 100.

The box housing 102 may be configured to provide protective access to a below ground valve 122, such as a water line valve for example. In some embodiments, the housing 102 may be configured to be arranged at or below a ground surface 124, such as a paving surface, for example. The box housing 102 may generally have an elongated shape in some embodiments, such as a cylindrical shape. In other embodiments, the box housing 102 may have an elongated rectangular, triangular, or other suitable shape. In some embodiments, the box housing 102 may generally match or be similar to the shape of the riser 120. The elongated box housing 102 may be hollow, with open ends. The box housing may have, for example, a first end having a first opening, which may be an access opening 108, and a second end having a second opening 116 opposing the first opening. The access opening 108 may be configured to be arranged at a ground surface 124, such as at a paving surface, for example, so as to provide above-ground access to a valve 122 arranged below the surface. The box housing 102 may have any suitable size, and may generally be sized to allow a tool to be inserted through the first 108 and second 116 openings to reach a valve 122. In some embodiments, the box housing 102 may have a width or diameter of between less than 3 inches and approximately 36 inches. Particularly, the box housing 108 may have a width or dimeter of between approximately 3 inches and approximately 24 inches. More particularly, the box housing 102 may have a width or diameter of between approximately 5 inches and approximately 12 inches in some embodiments. In other embodiments, the box housing 102 may have any other suitable width or diameter. The box housing 108 may have a length between the two openings 108, 116 of between approximately 6 inches and approximately 36 inches in some embodiments. Particularly, the box housing 102 may have a length of between approximately 12 inches and approximately 24 inches in some embodiments. In other embodiments, the box housing 102 may have any other suitable length. The box housing 108 may generally have an inner surface 106 and an outer surface 104. The outer surface 104 may be configured to be surrounded by soil, gravel, or other materials beneath a ground surface 124. The inner surface 106 may surround the hollow interior of the box housing 102. The box housing 102 and its components may be constructed of steel, plastic, and/or any suitable material(s).

In some embodiments, one or more fins 110 may be arranged on the outer surface 104 of the box housing 102. The one or more fins 110 may be configured to anchor the box housing 102 in the ground. That is, the one or more fins 110 may be configured to mitigate rotation of the box housing 102 with respect to the ground surface 124. In some embodiments, the one or more fins 110 may be configured to provide leverage against the soil or other material surrounding the box housing 102 in order to help a tool rotate a valve 122, as will be described further herein. The one or more fins 110 may generally extend between the access opening 108 and second opening 116. Each fin 110 may have a generally flattened, elongated shape with a length extending between the access opening 108 and second opening 116. Each of the one or more fins 110 may extend along a portion of the length of the box housing 102 in some embodiments. In other embodiments, one or more fins 110 may extend the full length of the box housing 102. Each fin 110 may have a width extending outward from the outer surface 104 of the box housing 102. The one or more fins 110 may have a width of between approximately 0.5 inches and approximately 12 inches in some embodiments. Particularly, the fins 110 may have a width extending between approximately 1 inch and approximately 6 inches. In other embodiments, the fins 110 may each have any other suitable width. In some embodiments, as shown for example in FIG. 5, the box housing 102 may have four fins 110 arranged about the perimeter of the box housing. In other embodiments, the box housing 102 may have two, three, five, six, or any other suitable number of fins 110 arranged about the perimeter of the box housing. The fins 110 may be evenly spaced around the outer surface 104 of the box housing 102. In other embodiments, the fins 110 may be discontinuous and/or intermittently or unevenly arranged. Consideration for the surrounding soil conditions may be given when selecting a suitable number and spacing of fins 110.

Figure 5:
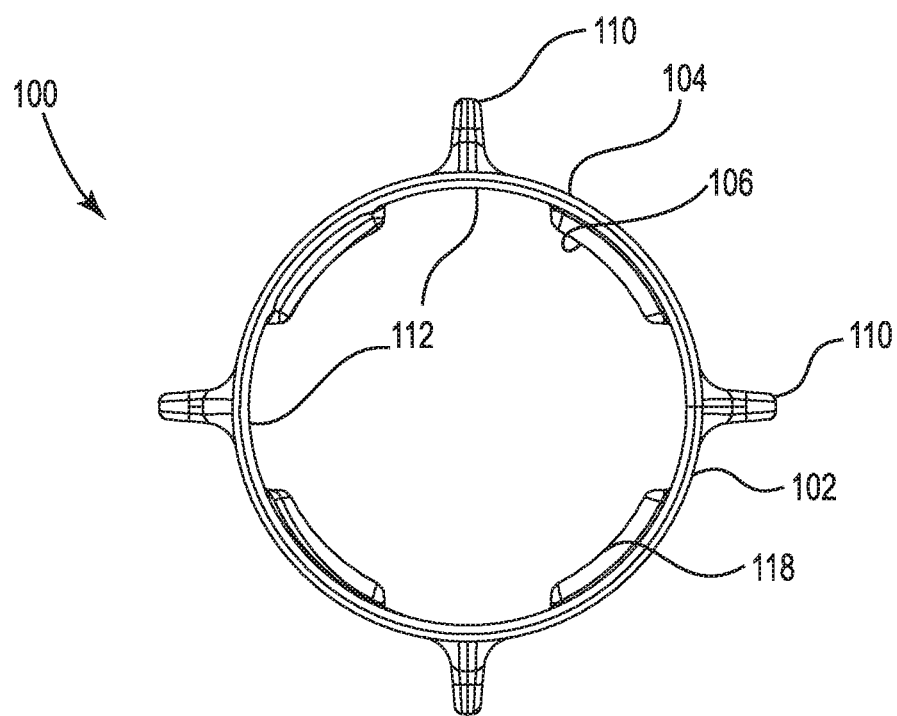
FIG. 5 is an end view of a valve box of the present disclosure, according to one or more embodiments.
Figure 6:
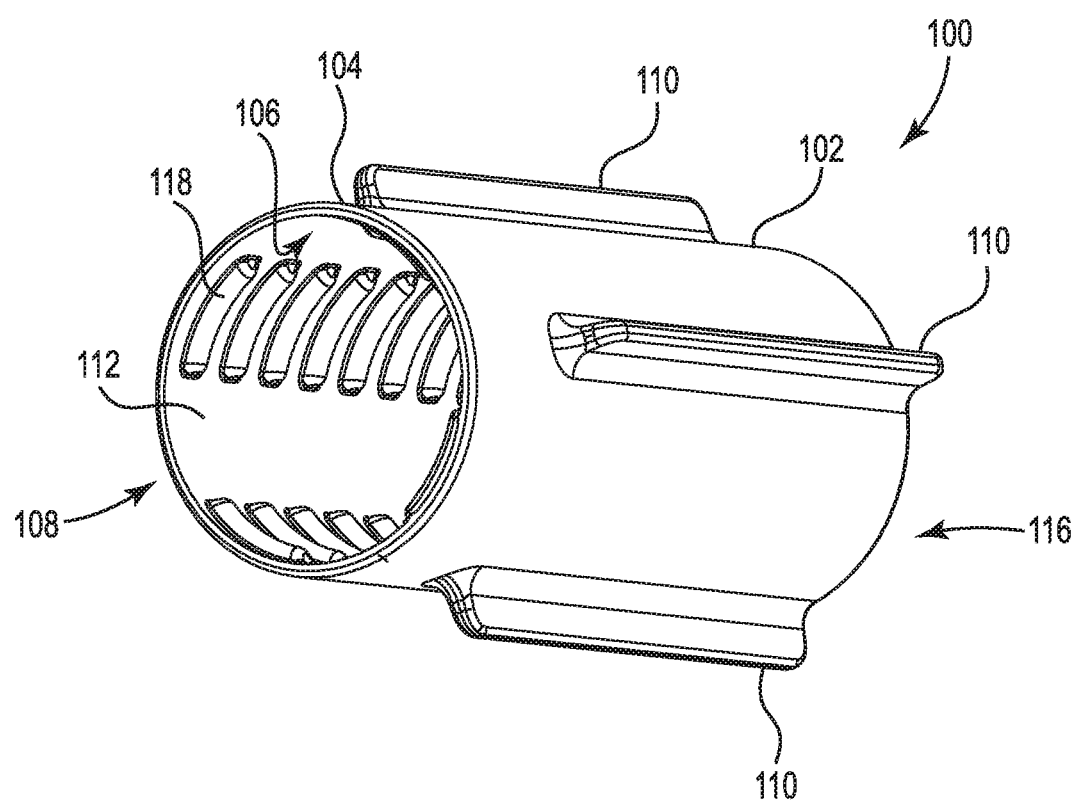
FIG. 6 is a perspective view of a valve box of the present disclosure, according to one or more embodiments.
Figure 7:
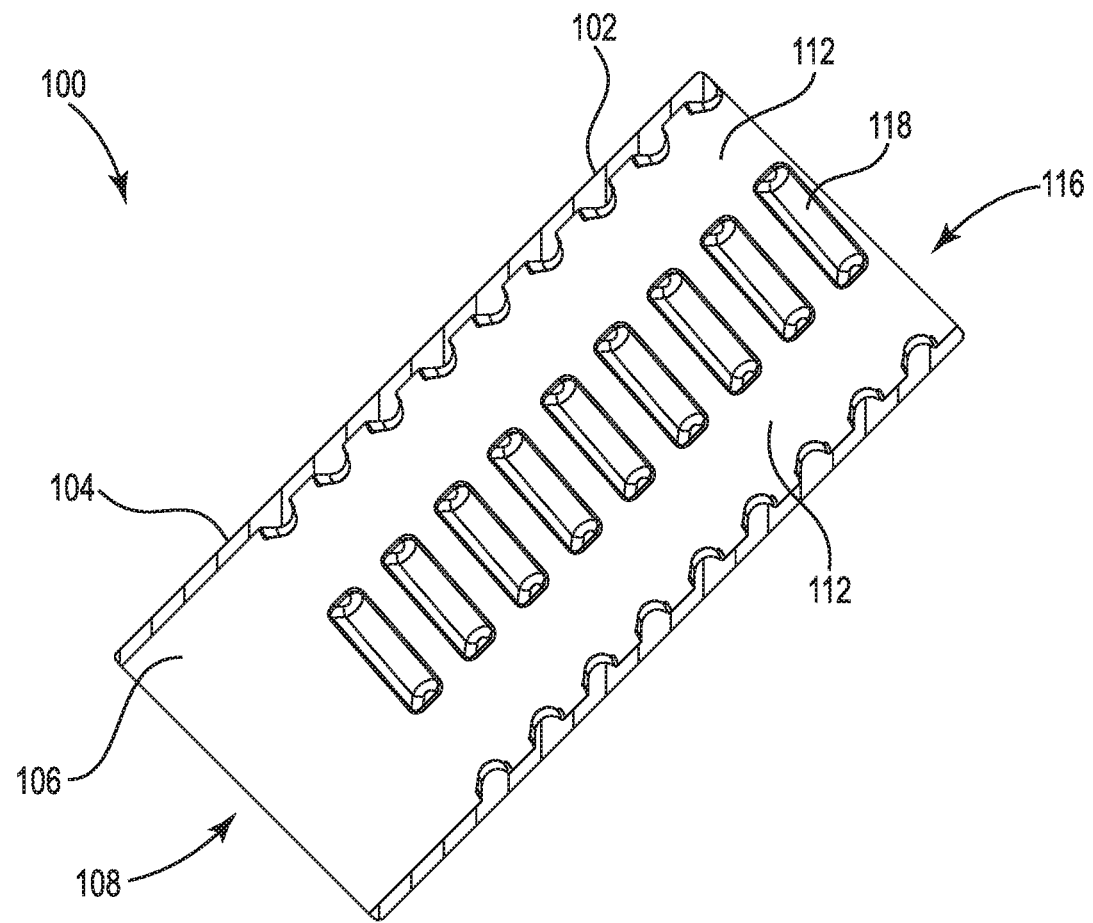
FIG. 7 is a cross sectional view of a valve box of the present disclosure, according to one or more embodiments.
Figure 8:
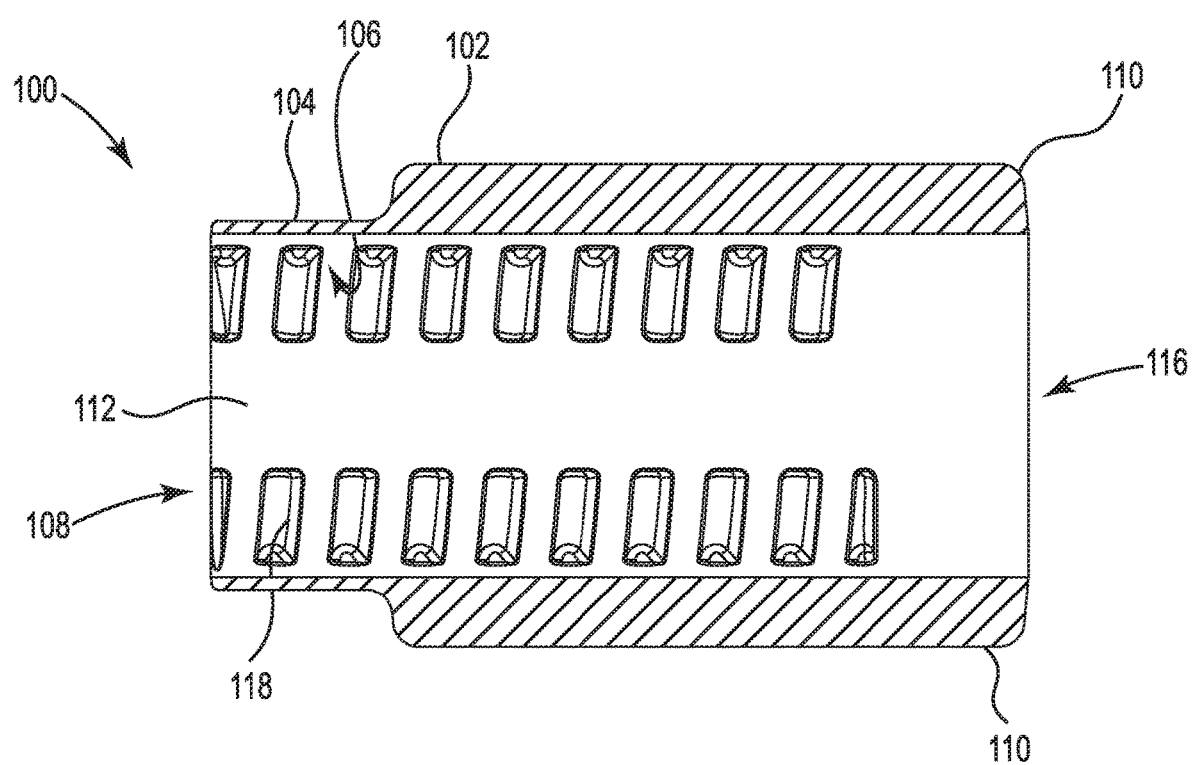
FIG. 8 is a cross sectional side view of a valve box of the present disclosure, according to one or more embodiments.
Figure 9A:
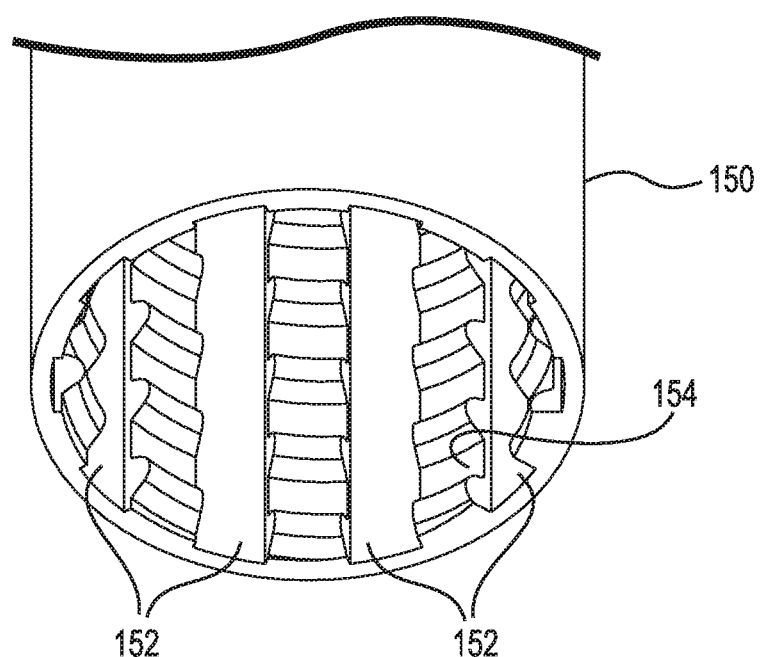
FIG. 9A is a perspective view of an end of a valve box housing of the present disclosure, according to one or more embodiments.
Figure 9B:
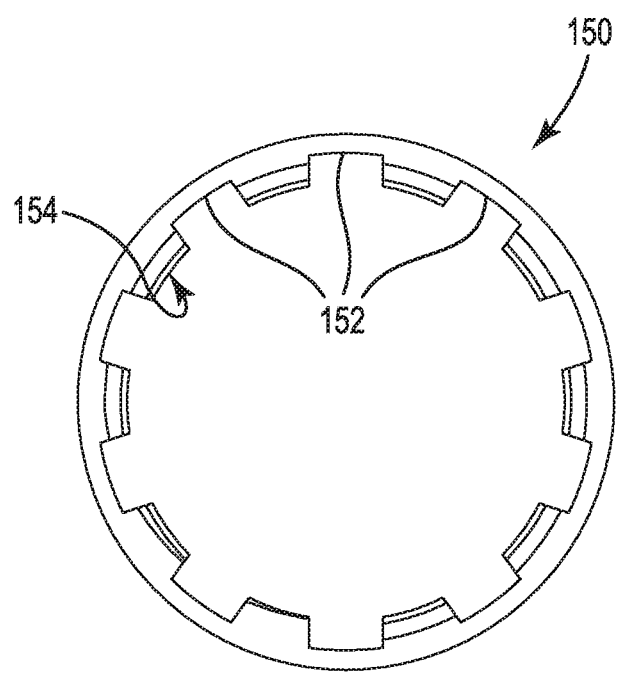
FIG. 9B is an end view of a valve box housing of the present disclosure, according to one or more embodiments.
Figure 10:
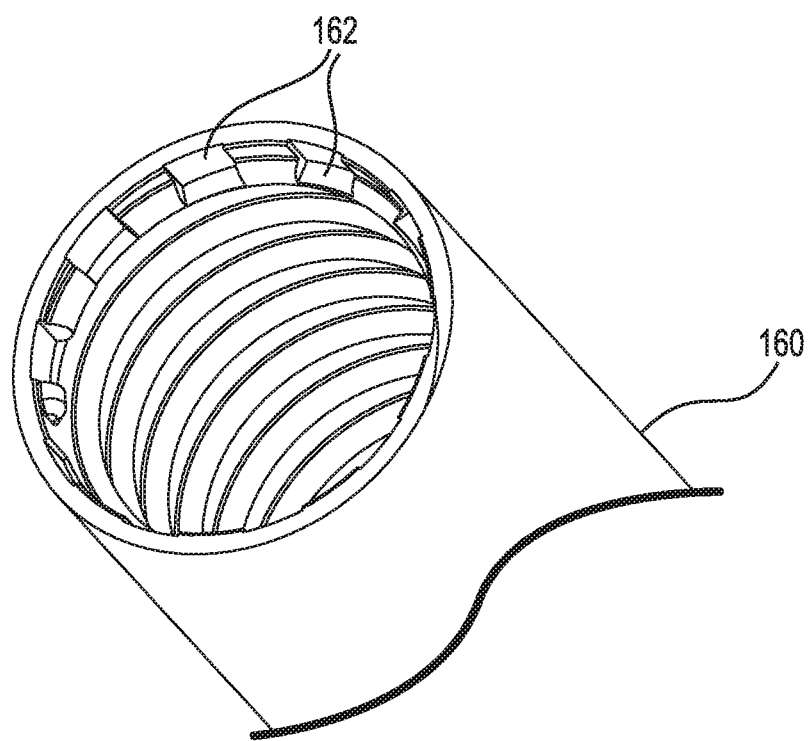
FIG. 10 is a perspective view of a valve box housing of the present disclosure, according to one or more embodiments.

In some embodiments, one or more keyways 112 may be arranged on the inner surface 106 of the box housing 102. As shown particularly in FIG. 5, each keyway 112 may be a groove or cutout in the inner surface 106 of the box housing 102. The keyways 112 may generally be configured to receive a tool configured to engage with the keyways, as is described further herein. Each keyway 112 may have a length extending between the access opening 108 and the second opening 116 of the box housing 102. In some embodiments, the one or more keyways 112 may extend the full length of the box housing 102, while in other embodiments, each keyways 112 may extend a portion of the length between the two openings 108, 116. In some embodiments, the keyways 112 may be discontinuous and/or intermittently arranged. In some embodiments, the one or more keyways 112 may have a width extending across a portion of the circumference of the inner surface 106. The keyways 112 may be evenly or unevenly spaced around the inner surface 106 of the box housing 102. As shown in FIG. 5, in some embodiments, the box housing 102 may have four keyways 112 arranged about the inside perimeter of the box housing. In other embodiments, the box housing 102 may have more or fewer keyways 112 arranged about the inside perimeter of the box housing. For example, another embodiment of the box housing 150 is shown in FIGS. 9A and 9B, wherein the box housing 150 has 10 keyways 152 evenly spaced around the inner surface 154 of the housing. FIG. 10 shows another embodiment of the box housing 160 where the box housing has keyways 162 having a shortened length along the inner threaded surface of the box housing. The keyways 112 may have any suitable depth cut into the inner surface of the box housing. FIG.

Figure 11:
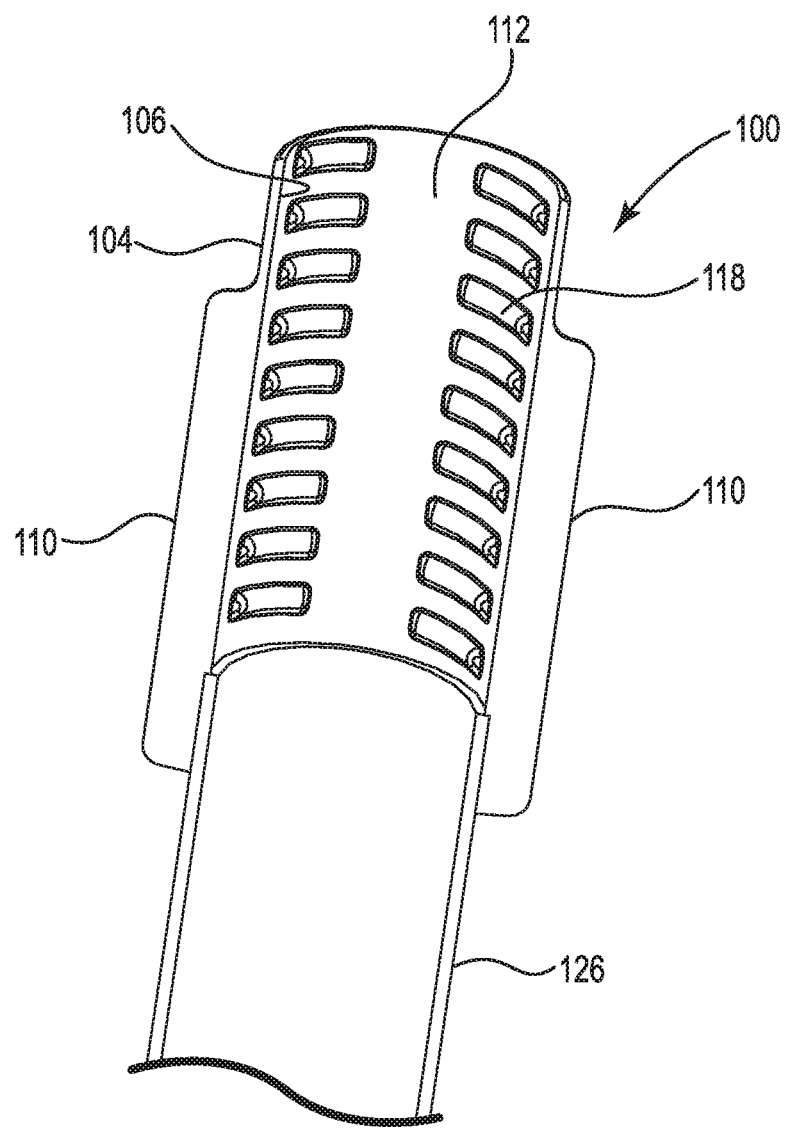
FIG. 11 is a cross sectional view of a valve box of the present disclosure coupled to a conduit, according to one or more embodiments.
Figure 12:
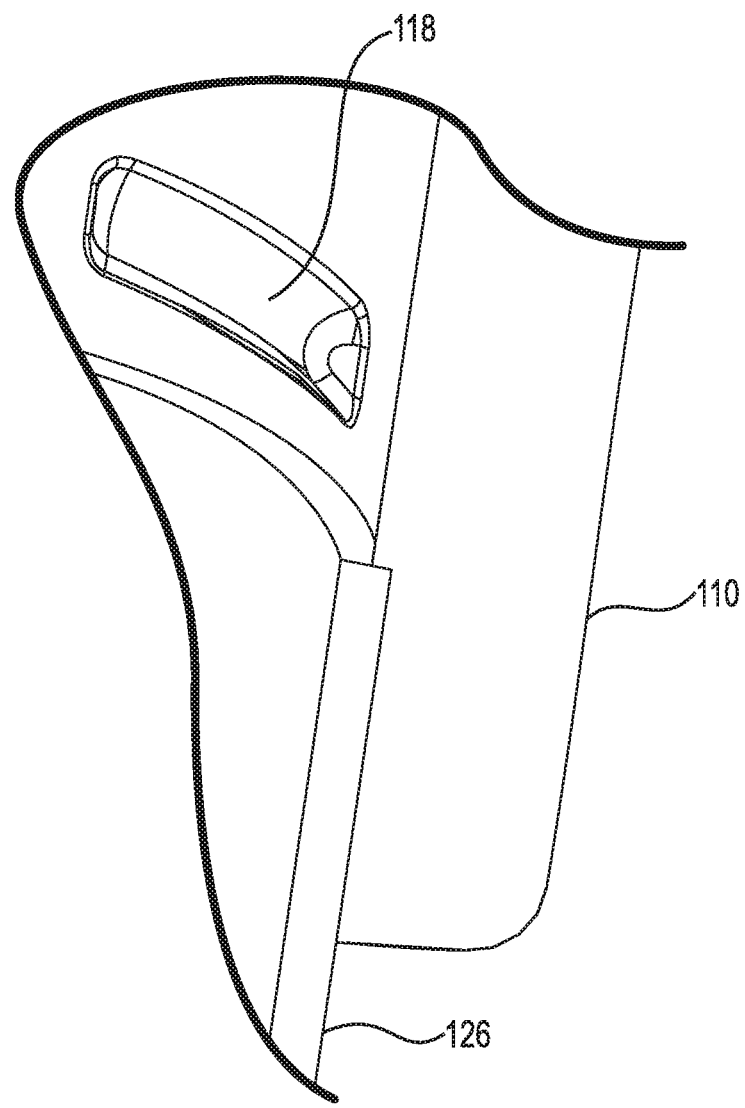
FIG. 12 is a detail cross sectional view of a valve box of the present disclosure coupled to a conduit, according to one or more embodiments.

In some embodiments, the inner surface 106 of the box housing 102, or a portion thereof, may additionally have threading 118. The threading 118 may allow the box housing 102 to engage with a riser, lower valve box portion, conduit, pipe, or other component having outer threading. The threading 118 may additionally allow the box housing 102 to engage with a cover or cap in some embodiments. In other embodiments, the box housing 102 may have other attachment means for coupling to a riser, lower valve box portion, conduit, pipe, cover, cap, or other component(s). It may be appreciated that the one or more keyways 112 may be cut into the threading 118 in some embodiments. The depth of the keyway 112 may be the same as the thread depth or the keyway depth may be less than or greater than the thread depth. For example, FIGS. 11 and 12 show a valve box 100 coupled to a conduit 126 having outer threading configured to engage with the threading 118 of the box housing. In some embodiments, the box housing 102 may be configured such that a desired minimum length of keyway 112 remains exposed above an attached conduit, riser, or other component, so as to accommodate receiving a tool of the present disclosure, as described further herein. For example, in some embodiments, a ridge may provide a stop to prevent the box housing 102 from being threaded too far onto a riser or conduit. In other embodiments, a user may trim or cut a length of the conduit or riser to ensure that the desired minimum length of keyway 112 remains exposed above the conduit or riser. In some embodiments, the minimum length of keyway 112 needed for receiving a tool of the present disclosure may be between approximately 1 inch and 12 inches. In other embodiments, a desired minimum length of exposed keyway 112 may be any suitable length corresponding with an associated tool.

In some embodiments, the box housing 102 may be configured to couple with different sizes or types of risers, conduits, or other components. For example, in some embodiments, the threading 118 may be sized such that the box housing 102 may still be slip fit over, or otherwise slid onto, a riser, conduit, or other component having a particular diameter. That is, the threading 118 may be sized so as to provide for slip fit of the box housing 102 with some conduits, risers, or other components. For example, the threading 118 may be sized such that the box housing 102 may be configured to slide onto a Schedule 40 polyvinyl chloride pipe, or other standard or known pipe size. In this way, the box housing 102 may be configured to couple to or operate with different risers or conduits using different attachment mechanisms. In still other embodiments, a box housing 102 of the present disclosure may be provided without threading 118. In some embodiments, an internal surface of a box housing of the present disclosure, or a portion thereof, may have an octagonal, heptagonal, hexagonal, pentagonal, square, triangular, or other shape configured to fit together with or grip a riser, conduit, or other component.

While in some embodiments the valve box 100, or portions thereof, may generally be constructed of cast iron or an otherwise generally singular component, in other embodiments, the valve box may be configured to be modular. For example, at least a portion of the valve box may be constructed of a plurality of modular rings or sections configured to couple together via threading, glue, fasteners, or other coupling mechanism(s). In this way, the length of the valve box may be lengthened by adding modular sections, or shortened by removing modular sections.

FIGS. 33-37 provide views of a modular valve box section 900 of the present disclosure, according to some embodiments. As shown, the modular section 900 may generally have a box housing 902 having an outer surface 904 with a plurality of fins 910 arranged thereon, and an inner surface 906 with a plurality of keyways 912 arranged thereon. In some embodiments, the modular section 900 may have internal threading 918. The housing 902, fins 910, keyways 912, and threading 918 may be similar to those described above with respect to the valve box 100. In some embodiments, a portion of the box housing 902 may have an indented or narrowed portion 920 on its outer surface 904 configured to receive another modular section arranged over the indented or narrowed surface. Additionally, in some embodiments, the modular section 900 may have one or more male tabs 922 and one or more female tabs 924. In some embodiments, the one or more male tabs 922 may be an extended surface or a shape in the narrowed surface 920, for example, that may be configured to receive a corresponding female tab 924 of a next modular section. Similarly, each of the one or more female tabs 924 may be a cutout configured to receive a corresponding male tab 922 of a next modular section. The tabs 922, 924 of adjacent modular section 900 may be configured to interlock with one another to help align modular sections, so as to ensure that the keyways 912, fins 910, and/or threading 918 align and are thus continuous for two or more modular sections. Additionally, the tabs 922, 924 may help to couple the modular sections.

Each modular section 900 may have any suitable length. For example, in some embodiments, a modular section 900 may have a length of between approximately 3 inches and approximately 24 inches. In other embodiments, each modular section 900 may have any other suitable length. In some embodiments, different modular sections 900 may have different lengths. A plurality of modular section 900 may be coupled together to form a complete valve box. It may be appreciated that modular sections 900 may be added or removed in order to lengthen or shorten the valve box, respectively, as needed. In some embodiments, an uppermost or capping modular section and/or a lowermost or base modular section may have different features than the modular section 900. For example, an uppermost or capping modular section configured to be arranged nearest the ground surface may be configured without fins 910 or with shortened fins in some embodiments.

Figure 13:
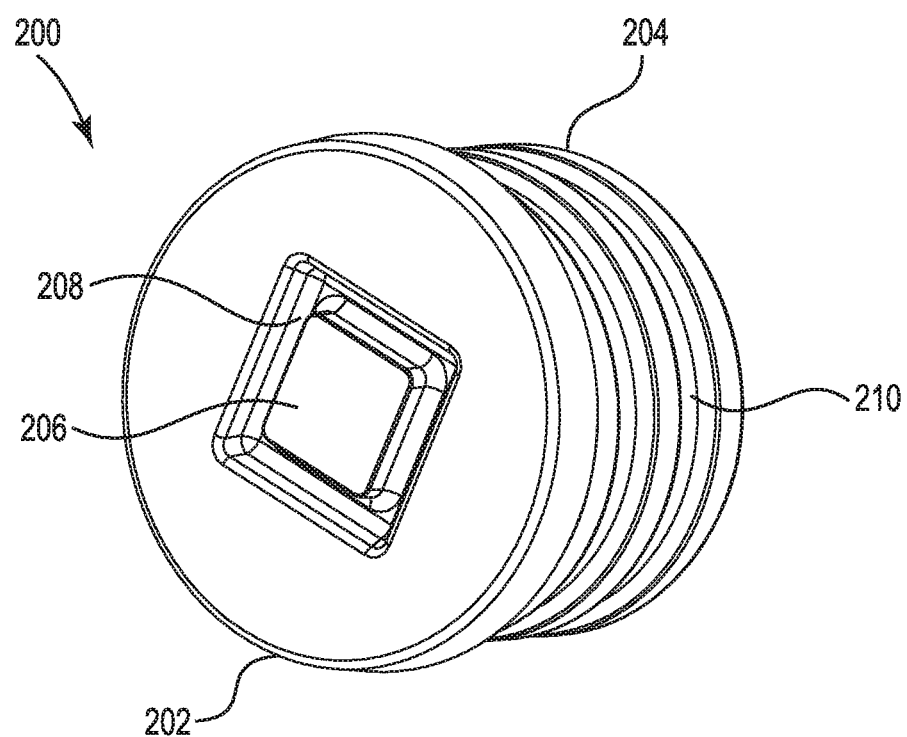
FIG. 13 is a perspective view of a valve box cover of the present disclosure, according to one or more embodiments.

In some embodiments, the valve access opening 108 may have a cover or lid configured to be arranged therein. Turning now to FIG. 13, a valve box cover 200 of the present disclosure is shown. The valve box cover 200 may be configured to be arranged in or over a valve box 100 of the present disclosure. The valve box cover 200 may be configured to provide a protective cover over the access opening 108 of the valve box 100. The valve box cover 200 may be removably fixed to the valve box 100, such that a worker may remove the cover as needed to access a valve 122. However, the valve box cover 200 may additionally be configured to remain in place with respect to the box 100 despite vehicle traffic, pedestrian traffic, rain, snow, or other surface conditions. The valve box cover 200 may generally have a surface portion 202 and a valve box engaging portion 204. FIGS. 14-22 show additional views of the valve box cover 200.

Figure 23:
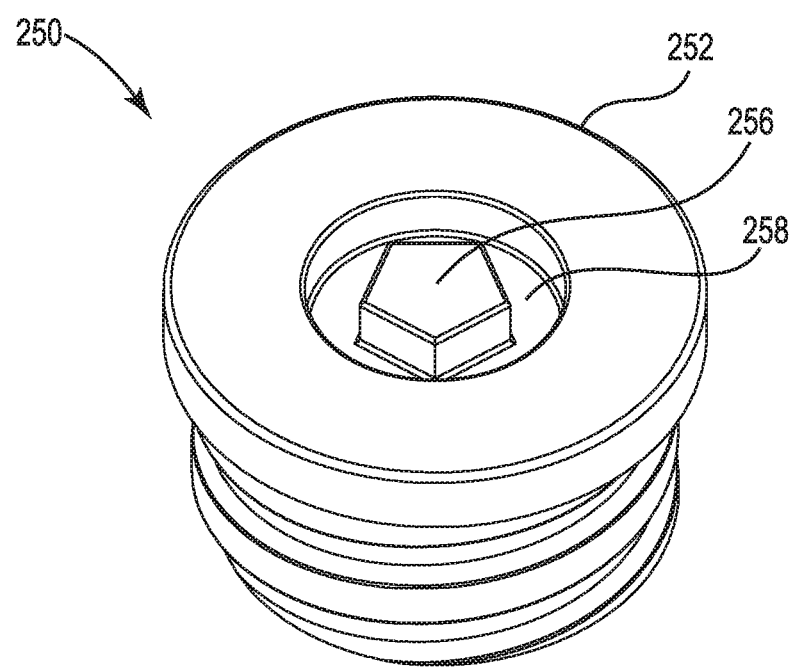
FIG. 23 is a perspective view of a valve box cover of the present disclosure, according to one or more embodiments.

The surface portion 202 may be configured to provide a cover over the access opening 108 of the valve box 100 when the valve box cover 200 is in place. In some embodiments, the surface portion 202 may be configured to be visible at or above ground level, so as to help locate the valve box 100. The surface portion 202 may have a width or diameter similar to that of the access opening 108 of the valve box housing 102. In some embodiments, the surface portion 202 may have an operating nut 206. The operating nut 206 may be configured to allow a user to position the valve box cover 200 on the valve box 100, to remove the valve box cover, or to tighten or loosen the valve box cover. For example, the operating nut 206 may be configured to engage with a tool in some embodiments. Additionally or alternatively, the operating nut 206 may provide a hand hold for a user. The operating nut 206 may be defined by one or more grooves 208 or cutouts in the surface portion 202. For example, as shown in FIG. 13, a groove 208 may be cut into the surface portion 202 in a square shape, defining a square-shaped operating nut 206. FIG. 23 shows another embodiment of a valve box cover 250, wherein a pentagonal operating nut 256 may be defined by a pentagonal groove 258 in the surface portion 252.

Figure 14:
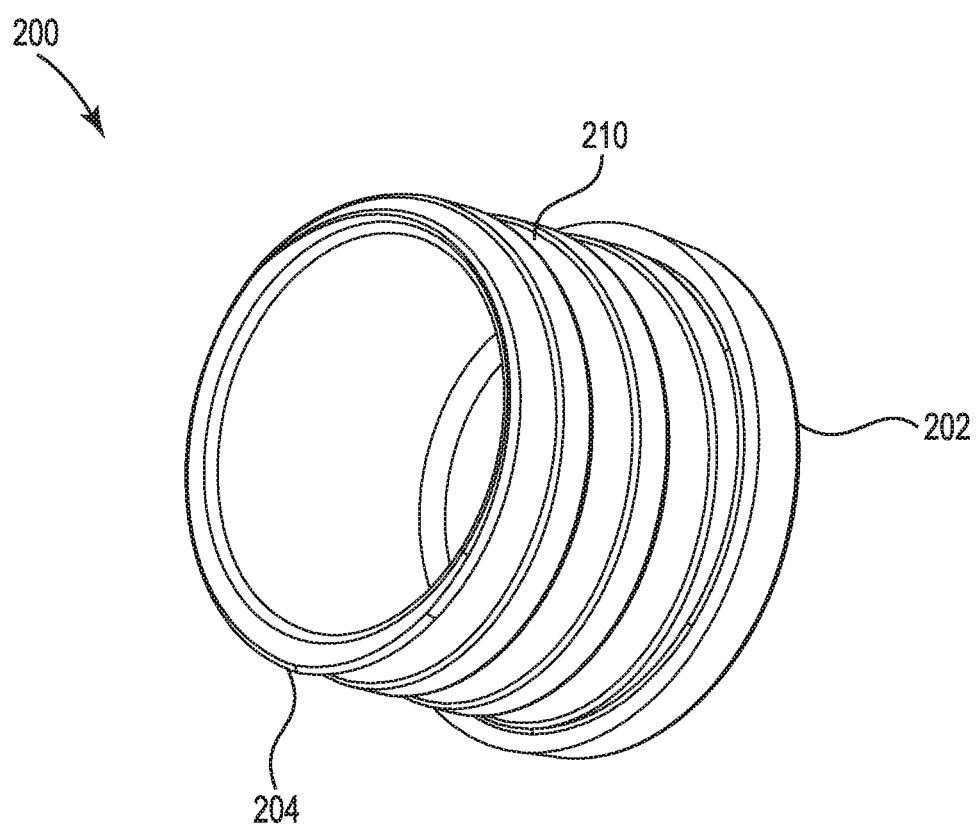
FIG. 14 is a perspective view of a valve box cover of the present disclosure, according to one or more embodiments.
Figure 15:
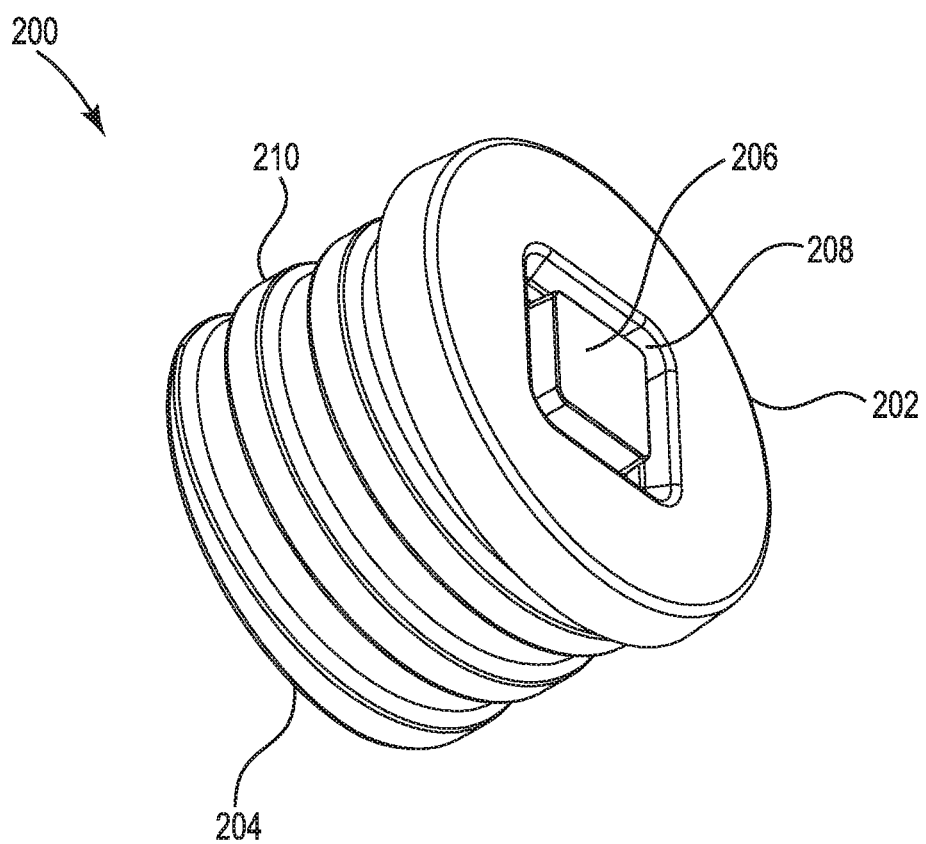
FIG. 15 is a perspective view of a valve box cover of the present disclosure, according to one or more embodiments.
Figure 16:
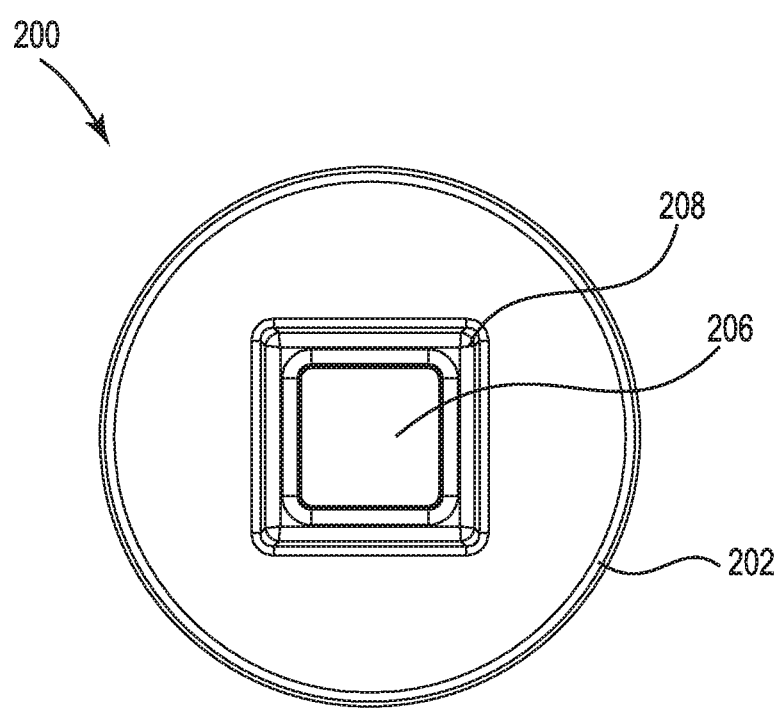
FIG. 16 is an end view of a valve box cover of the present disclosure, according to one or more embodiments.
Figure 17:
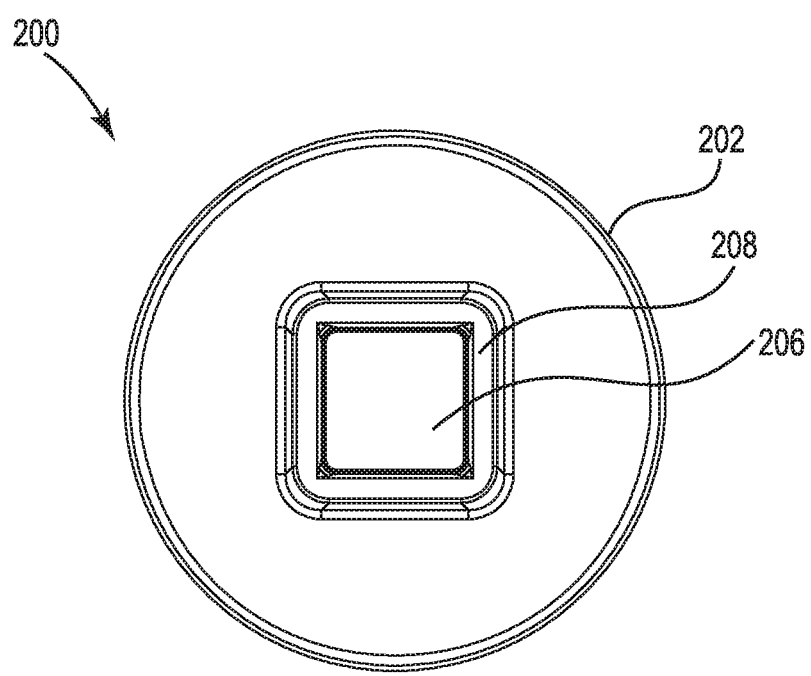
FIG. 17 is an end view of a valve box cover of the present disclosure, according to one or more embodiments.
Figure 18:
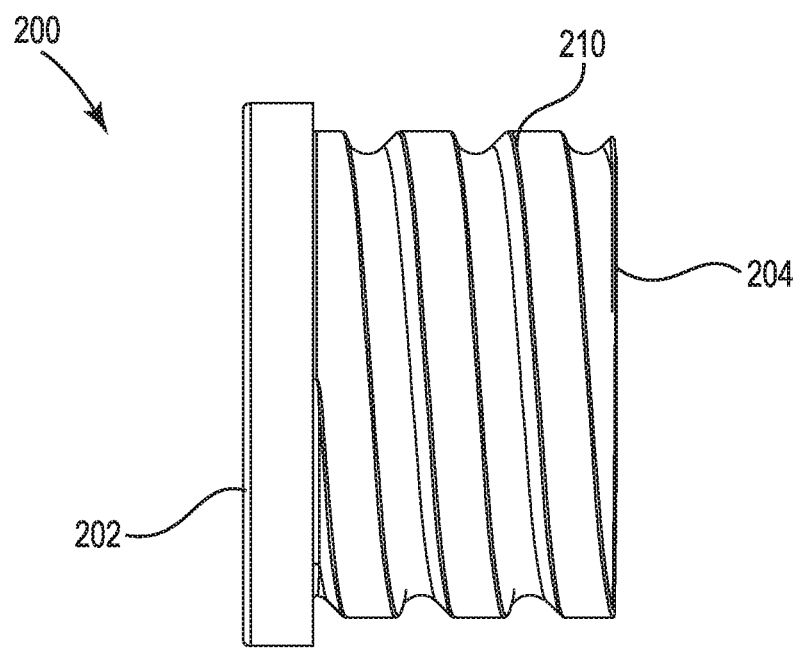
FIG. 18 is a side view of a valve box cover of the present disclosure, according to one or more embodiments.
Figure 19:
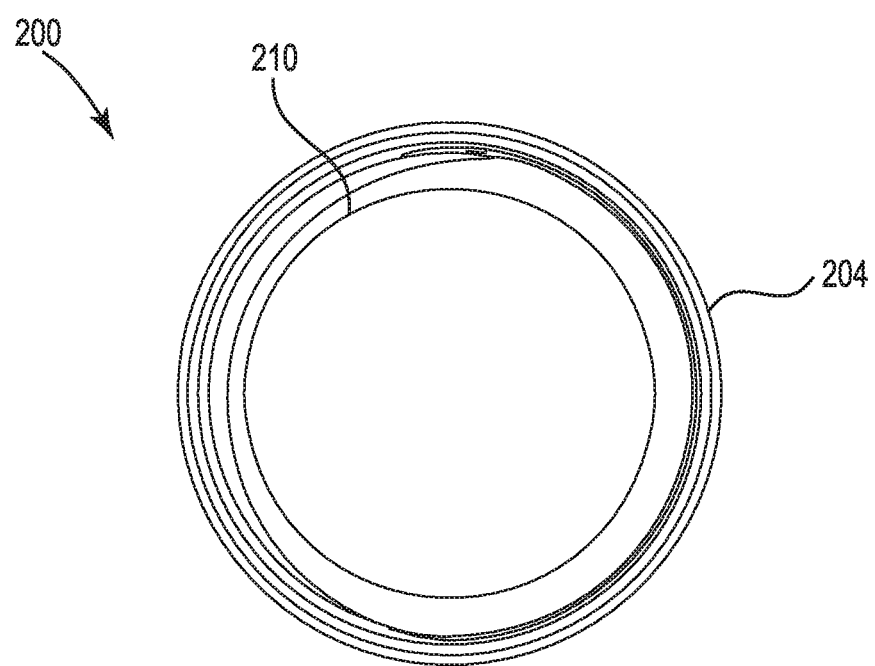
FIG. 19 is an end view of a valve box cover of the present disclosure, according to one or more embodiments.
Figure 20:
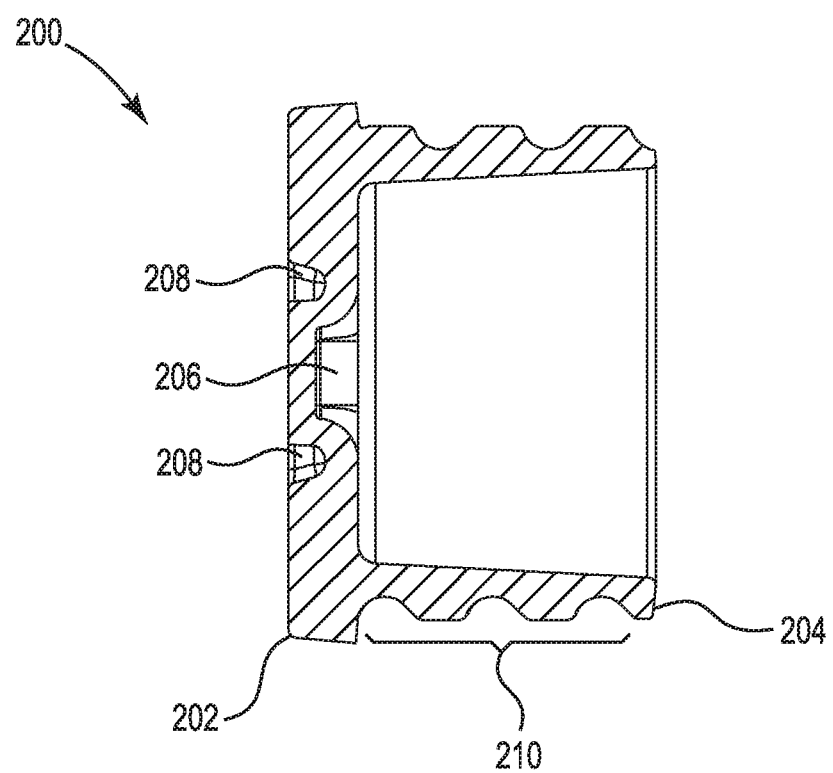
FIG. 20 is a cross sectional view of a valve box cover of the present disclosure, according to one or more embodiments.
Figure 21:
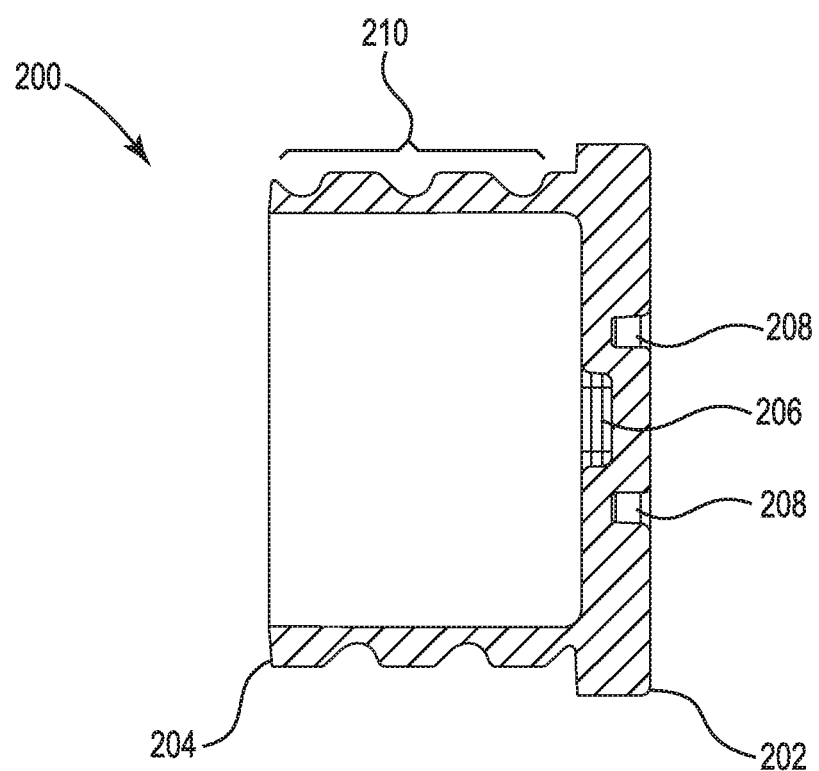
FIG. 21 is a cross sectional view of a valve box cover of the present disclosure, according to one or more embodiments.
Figure 22:
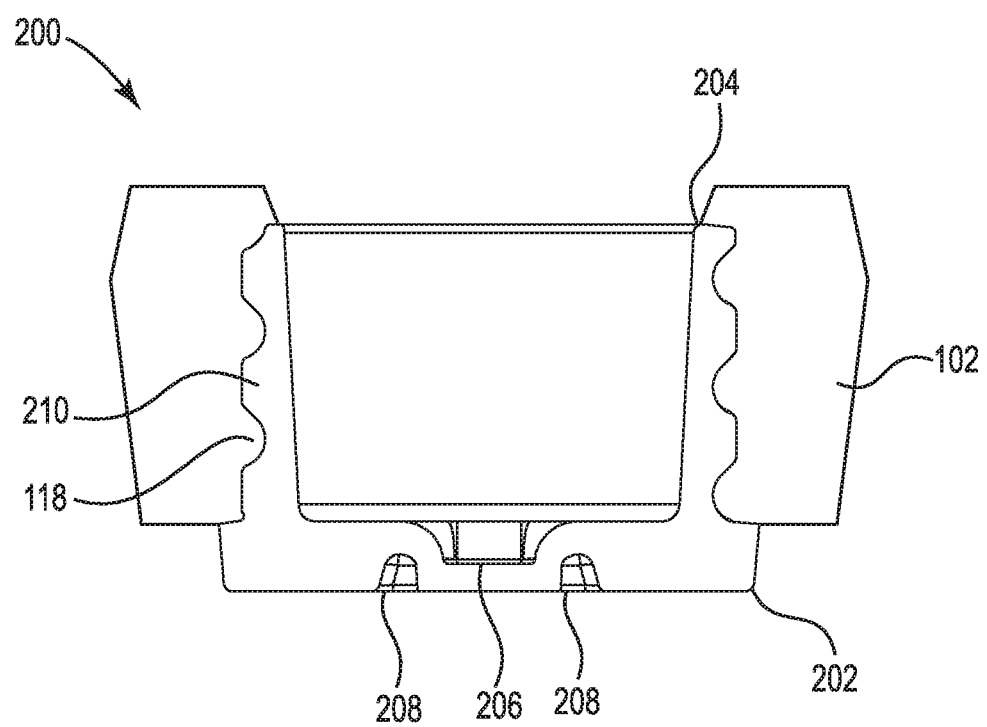
FIG. 22 is a cross sectional view of a valve box cover of the present disclosure, according to one or more embodiments.

The valve box engaging portion 204 may extend laterally from a side of the surface portion 202 opposing the side having the operating nut 206. The engaging portion 204 may be configured to engage with the valve box 100. In some embodiments, the valve box engaging portion 204 may have a width or diameter configured to be arranged within the valve box housing 102. As shown in FIG. 14, the valve box engaging portion 204 may have a hollow interior. The engaging portion 204 may have threading 210 arranged on an outer surface configured to engage with the threading 118 on the inner surface 106 of the box housing 102. In other embodiments, the engaging portion 204 may have a different mechanism configured to couple the cover 200 to the valve box 100.

Figure 24:
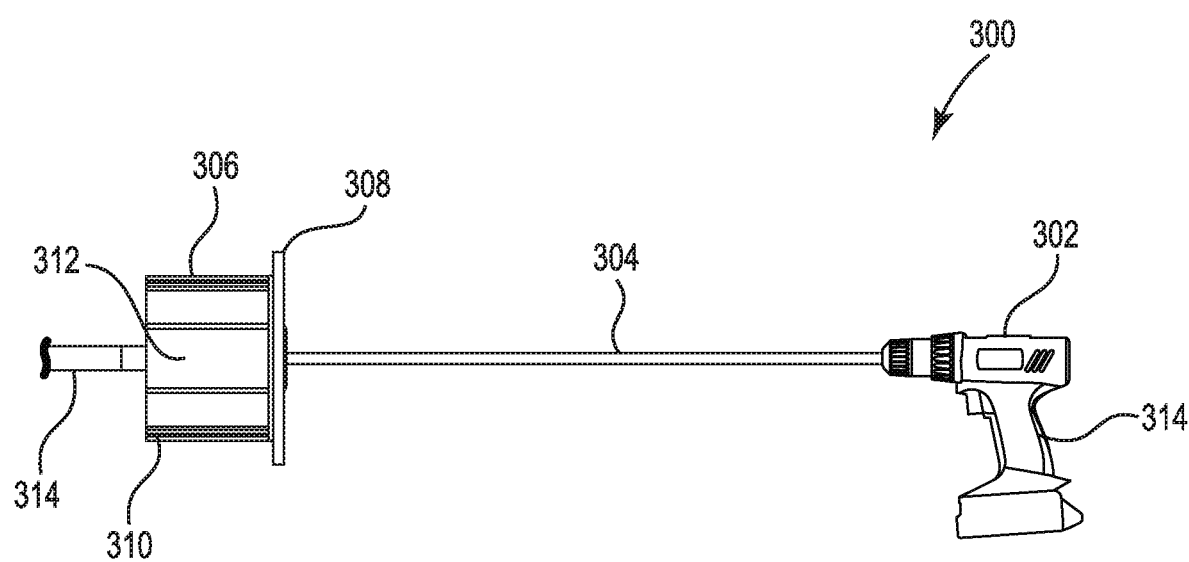
FIG. 24 is a side view of a valve box tool of the present disclosure, according to one or more embodiments.

In some embodiments, a valve box tool may be used to operate a valve 122 accessible via a valve box 100 of the present disclosure. Turning now to FIG. 24, a valve box tool 300 of the present disclosure is shown. The valve box tool 300 may be configured to operate in conjunction with a valve box 100 to rotate a valve lever, dial, wheel, or to otherwise operate a valve 122. The valve box tool 300 may generally be configured to use the valve box 100 as rotational leverage when operating a valve 122. In this way, the valve box tool 300 may allow a valve 122 to be operated, and in particular a stuck or stiff valve, while minimizing worker labor needed. The valve box tool 300 may generally have a driving portion 302, a stem portion 304, and a valve box engaging portion 306.

The driving portion 302 may be configured to provide a driving force for operating a valve 122 accessible via the valve box 100. For example, the driving portion 302 may have a motor, such as a battery powered motor or other motor configured to operate on the stem portion 304. In other embodiments, the driving portion 302 may include an air compressor or air motor or other driving force. In some embodiments, the driving portion 302 may be configured to be operated by a user. The driving portion 302 may provide a hand hold 314 in some embodiments for a user to hold the tool 300 while operating the tool. In some embodiments, the driving portion 302 may be shaped similarly to an electric drill, for example. In other embodiments, the driving portion 302 may be shaped or configured in any other suitable configuration.

The stem portion 304 may extend from the driving portion 302, and may be configured to extend through the valve box engaging portion 306 to reach a valve 122. The stem portion 304 may be configured to transfer torque from the driving portion 302 to the valve box engaging portion 306 and/or to the valve 122 via the valve box engaging portion. In some embodiments, the stem portion 304 may have a hexagonal cross sectional shape in order to engage a drill chuck, for example, or other shapes may be provided. In some embodiments, the stem portion 304 may extend into an opening in the valve box engaging portion 306, for example. In some embodiments, a second stem portion 314 may extend from the valve box engaging portion 306 and extend to reach a valve 122 below. Rotation of the stem portion 304 may generally cause the second stem portion 314 extending to the valve 122 to rotate. In some embodiments, this may be performed through a series of gears contained within the valve box engaging portion 306, as described below.

Figure 25:
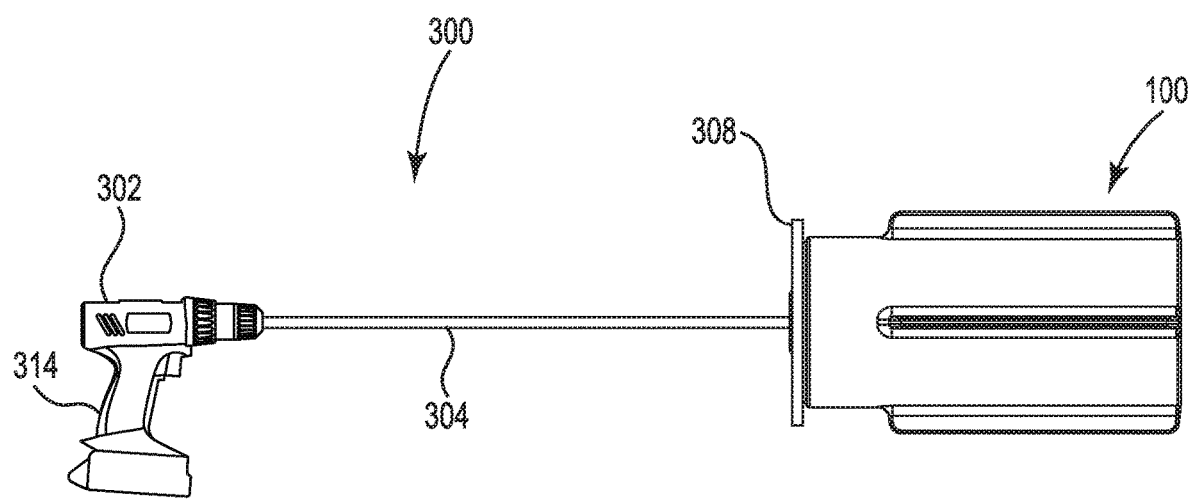
FIG. 25 is a side view of a valve box tool and a valve box of the present disclosure, according to one or more embodiments.

The valve box engaging portion 306 may generally be configured to be positioned within the valve box housing 102, through the access opening 108. The valve box engaging portion 306 may be configured to engage with the valve box 100 via the keyways 112, such that the valve box may be used as leverage to help isolate a user from resistive valve forces. In one embodiment, the valve box engaging portion 306 may slidingly engage the valve box 100 by inserting it lengthwise through the access opening 108 of the valve box. The valve box engaging portion 306 may generally have a surface portion 308 and a key portion 310. In some embodiments, the surface portion 308 may be configured to be arranged on or over the access opening 108 of the valve box 100, as shown for example in FIG. 25. For example, the surface portion 308 may have a diameter or width similar to or slightly larger than that of the access opening 108 in some embodiments. The key portion 310 may extend from the surface portion 308 and may be configured to extend into the box housing 108. The key portion 310 may be shaped and sized to fit within the box housing 102. For example, where the box housing 102 has a cylindrical shape, the key portion 310 may in turn have a similar cylindrical shape. The key portion 310 may have one or more keys 312 evenly or unevenly spaced around the circumference of the key portion so as to match and/or align with the keyways 112 in the box housing 102. Each key 312 may be configured to engage with a keyway 112 of the box housing 102. By engaging with the keyways 102, the valve box engaging portion 306 of the tool 300 may be configured to generally resist rotation.

Figure 32:
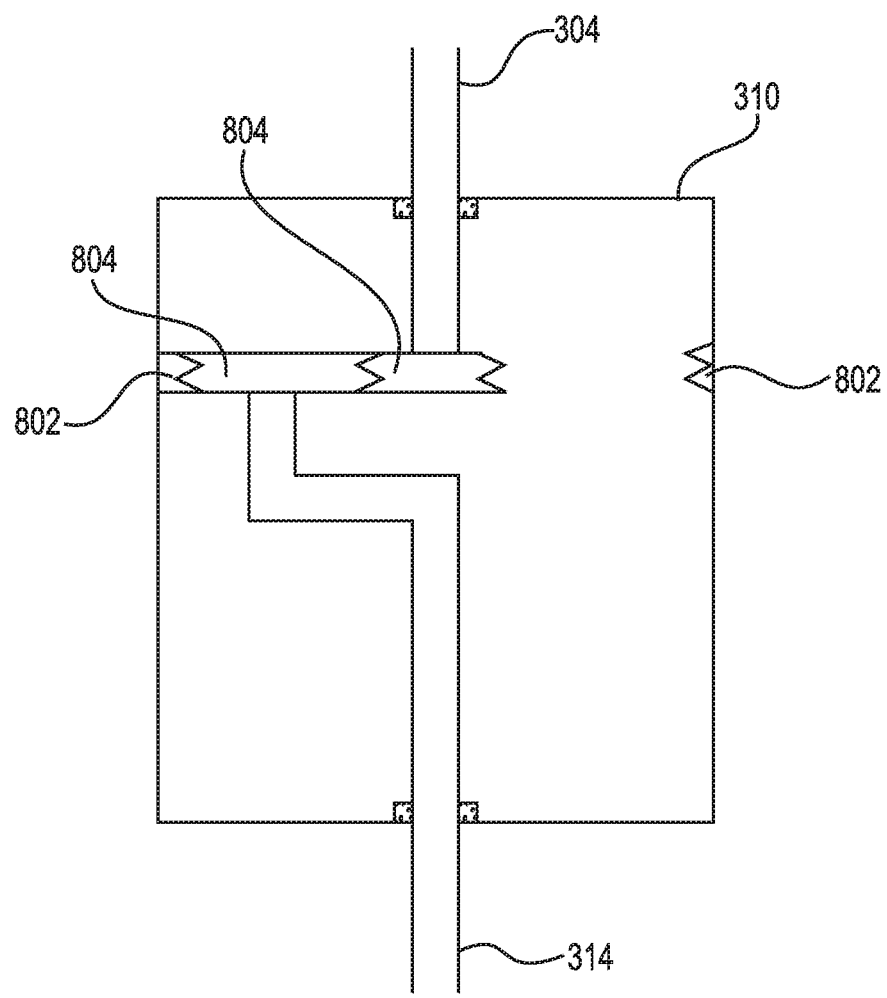
FIG. 32 is a schematic drawing of a key portion of a valve box tool of the present disclosure, according to one or more embodiments.
Figure 33:
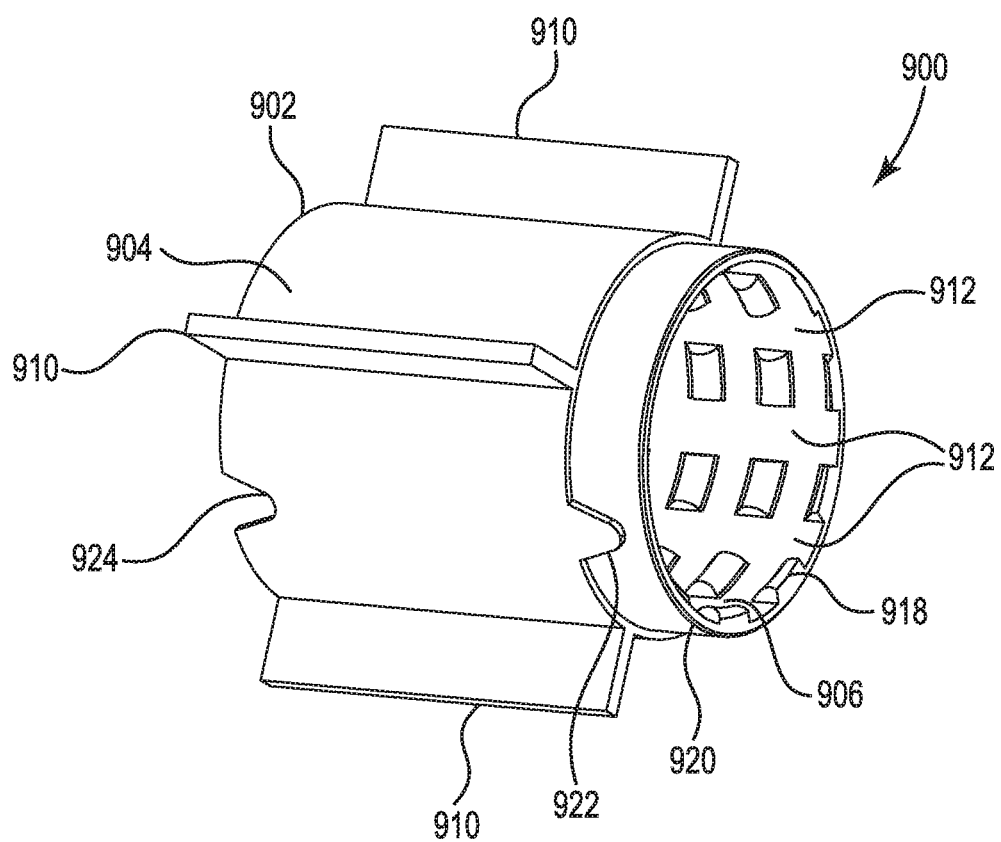
FIG. 33 is a perspective view of a modular valve box section of the present disclosure, according to one or more embodiments.
Figure 34:
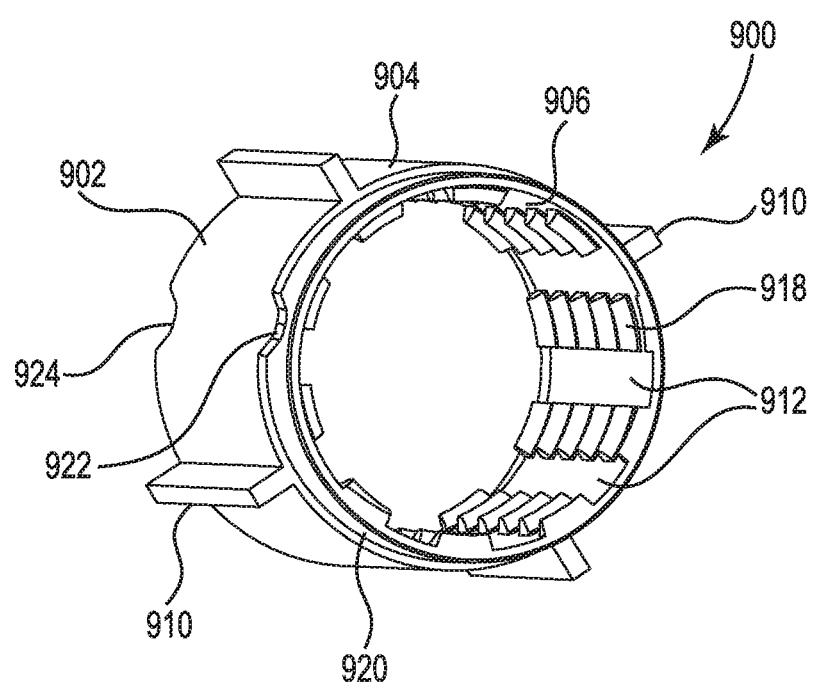
FIG. 34 is a perspective view of a modular valve box section of the present disclosure, according to one or more embodiments.
Figure 35:
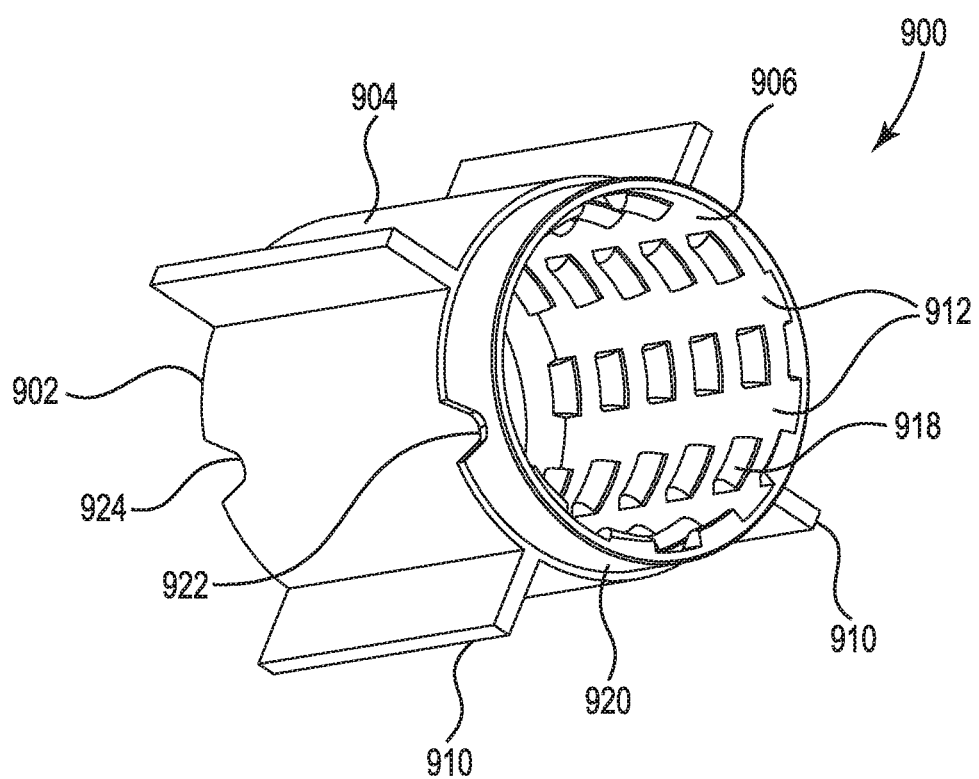
FIG. 35 is a perspective view of a modular valve box section of the present disclosure, according to one or more embodiments.
Figure 36:
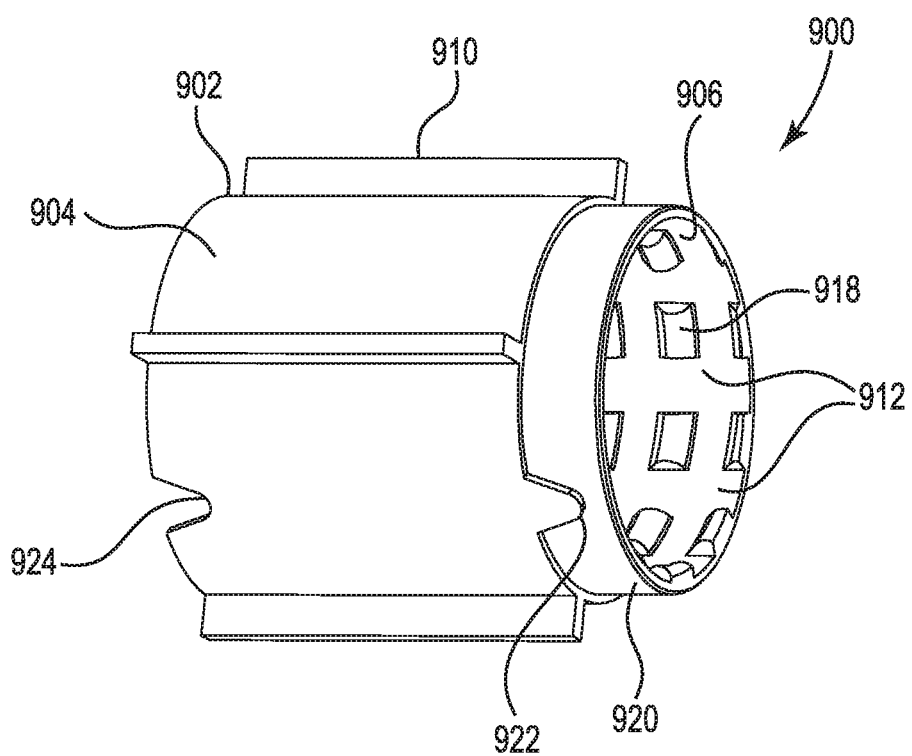
FIG. 36 is perspective view of a modular valve box section of the present disclosure, according to one or more embodiments.
Figure 37:
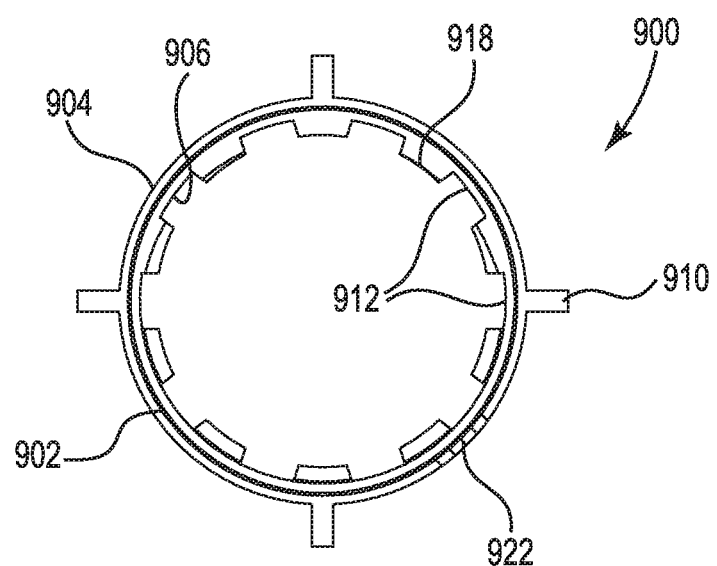
FIG. 37 is an overhead view of a modular valve box section of the present disclosure, according to one or more embodiments.

In one embodiment, the key portion 310 may comprise a gear box having a plurality of gears configured to transfer rotation of the stem portion 304 to the valve 122, provide a torque multiplier, and transfer resistive force of the valve to the box housing 102. FIG. 32 shows one schematic example of a gear box that may be arranged within a key portion 310 of the present disclosure. In one embodiment, an internal surface of the key portion 310 may be a toothed surface 802 about which one or more gears 804 are configured to rotate. Resistance from a valve 122 may be transferred from the second stem portion 314, which may in turn be transferred via one or more gears 804 to the toothed internal surface 802 of the key portion 310. This resistive force from the valve 122 may thus be transferred to the valve box 100 as the keyways 112 resist rotation of the key portion 310 caused by the resistive force. In this way, the valve box 100 may operate as a fulcrum. Moreover, as the fins 110 may help to resist rotation of the valve box 100 within the ground, the resistive force of the valve 122 may ultimately be transferred to the ground. In this way, the geared key portion 310 may help to isolate a user from the resistive force of a valve 122 or from at least a portion of the resistive force of the valve. It may be appreciated that such force isolation and torque multiplication of the gear box may significantly reduce the amount of work and/or time needed to exercise a valve, for example. In other embodiments, other gear box arrangements or other mechanisms may be used to transfer resistive forces of the valve 122 to the valve box 100 and/or to the ground. Moreover, in other embodiments, other torque multipliers may be used.

Figure 26:
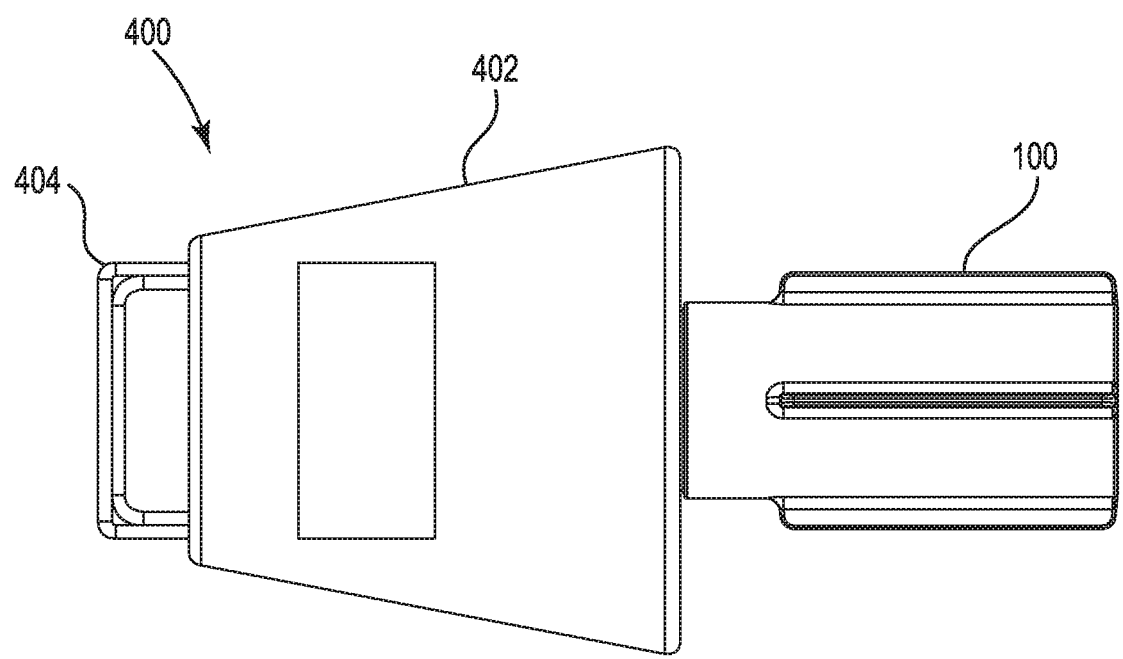
FIG. 26 is a side view of a valve box tool of the present disclosure, according to one or more embodiments.

FIG. 26 shows another embodiment of a valve box tool 400 of the present disclosure. The valve box tool 400 may have a driving portion 402 providing a driving force for operating a valve 122, and additionally providing a hand hold 404 for a user. In some embodiments, the driving portion 402 may be configured to be arranged on or over the valve box 100, as shown in FIG. 26. A valve box engaging portion may extend from the driving portion 402 and into the valve box 100 in some embodiments (not shown). Further, a stem portion (not shown) may extend therefrom to reach the valve. In some embodiments, the valve box tool 400 may be configured to operate automatically or semi-automatically. For example, the valve box tool 400 may be configured to be positioned on a valve box 100 by a user, and may be left in place over the valve box and operated remotely until the valve operation is complete. In some embodiments, for example, the valve box tool 400 may be programmable and may be configured to operate a particularly programmed sequence with respect to a valve exercising operation. A user may press a switch on the tool 400 to begin the programmed sequence or may initiate the sequence remotely in some embodiments. In some embodiments, the tool 400 or another valve box tool of the present disclosure may have particular coloring, such as safety orange, or a standard construction, safety, or hazard signaling coloring.

Figure 27:
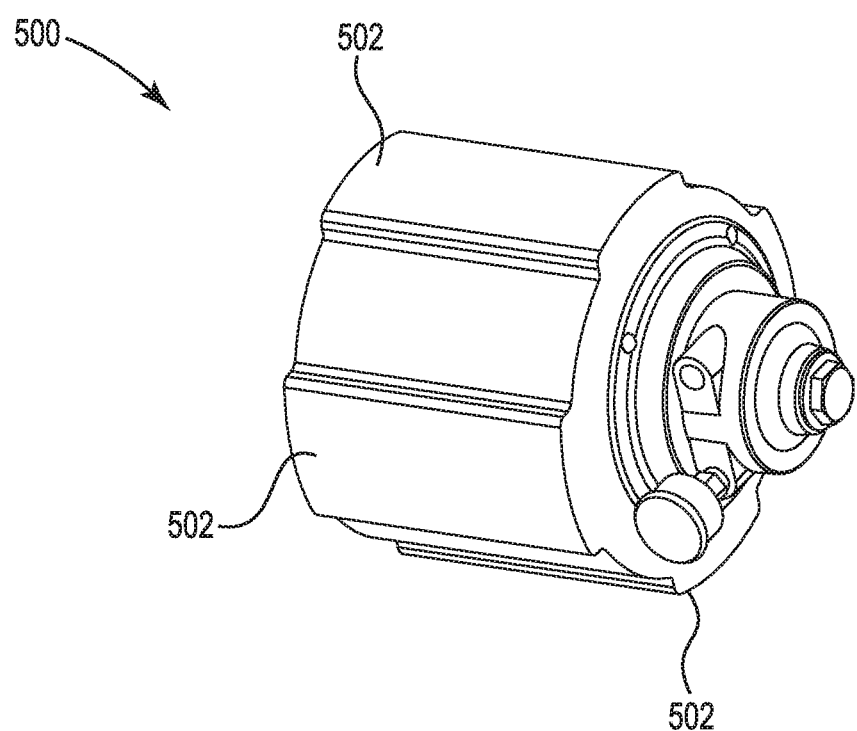
FIG. 27 is a perspective view of an automatic valve box tool of the present disclosure, according to one or more embodiments.
Figure 28:
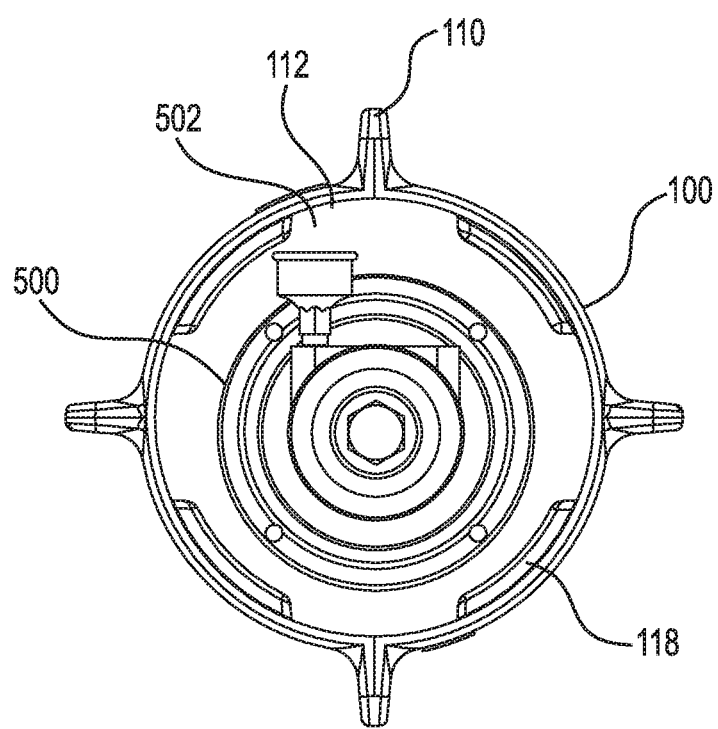
FIG. 28 is an end view of an automatic valve box tool of the present disclosure, according to one or more embodiments.
Figure 29:
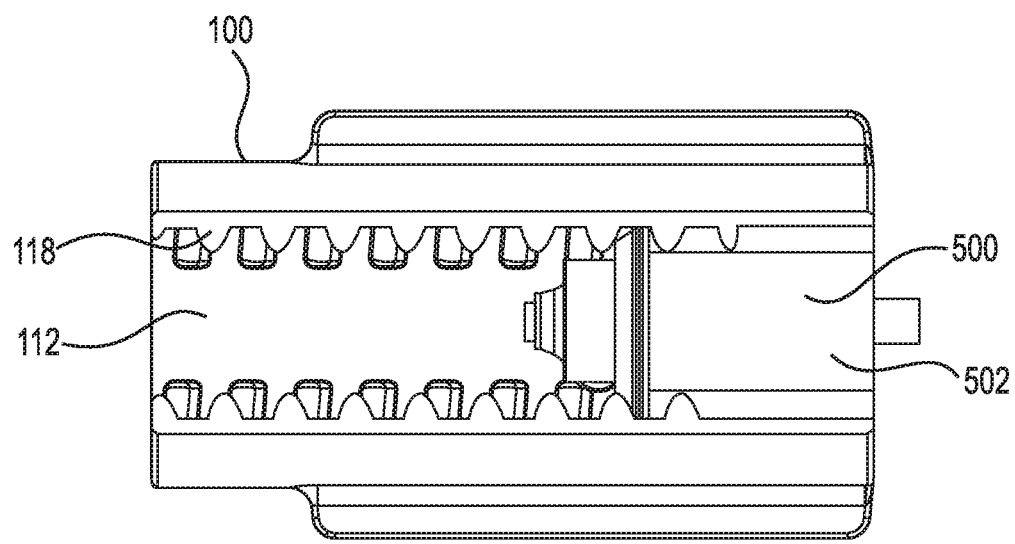
FIG. 29 is a cross sectional view of a valve box and an automatic valve box tool of the present disclosure, according to one or more embodiments.

In some embodiments, a valve box tool may be an automated or partially automated tool that may be configured to be permanent or semi-permanent within the valve box 100. For example, FIGS. 27-29 show an automatic valve box tool 500 of the present disclosure. The automatic valve box tool 500 may have an internal driver, such as an electric motor. The automatic valve box tool 500 may be configured to be arranged within a valve box 100 to automatically or partially automatically operate a valve 122. The automatic tool 500 may be shaped and sized to fit within the box housing 102. For example, where the box housing 102 has a cylindrical shape, the tool 500 may, in turn, have a similar cylindrical shape. The tool 500 may have one or more keys 502 evenly spaced around its circumference. Each key 502 may be configured to engage with a keyway 112 of the box housing 102. By engaging with the keyways 112, the tool 500 may be configured to generally resist rotation, such that the valve box 100 may be used as leverage to help operate a valve 122. The automatic valve box tool 500 may be permanently or semi-permanently positioned in the valve box and may be operated remotely in some embodiments. A particular utility, for example, may equip multiple valve boxes 100 with a tool 500, allowing valves to be worked without physically visiting the valve boxes.

Figure 30A:
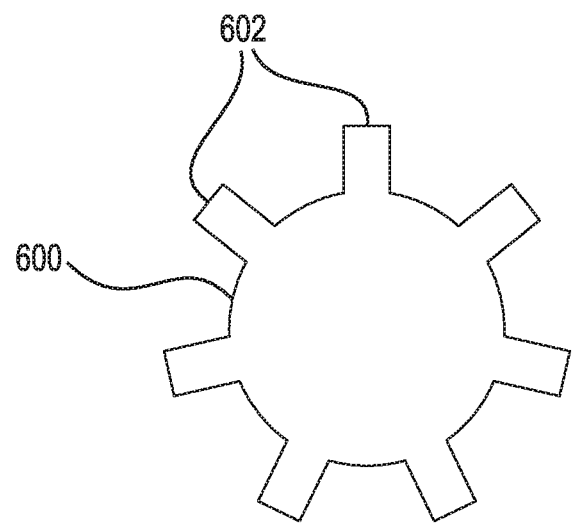
FIG. 30A is an overhead view of a valve box tool of the present disclosure, according to one or more embodiments.
Figure 30B:
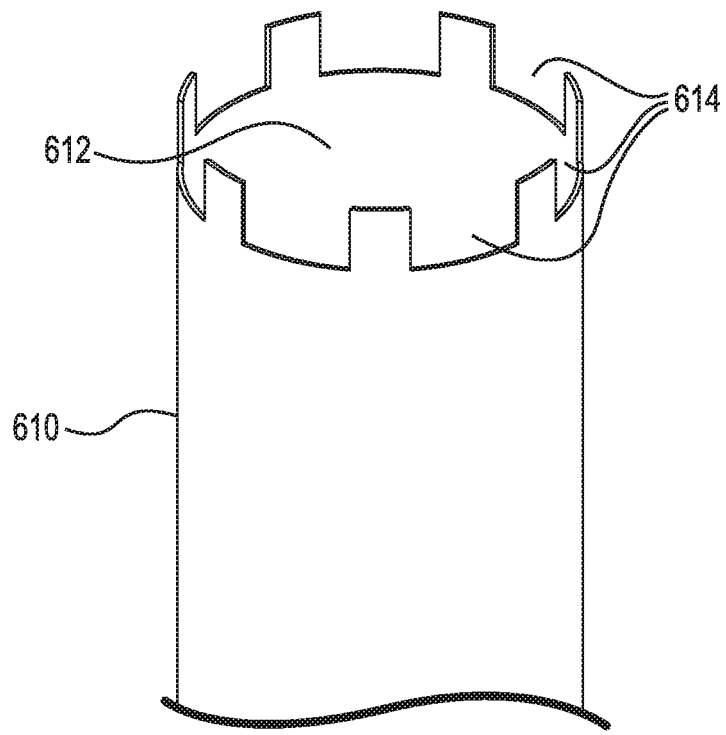
FIG. 30B is a perspective view of a valve box of the present disclosure, according to one or more embodiments.

In some embodiments, a valve box and valve box tool may have differently positioned keys and keyways for engagement. For example, FIGS. 30A and 30B show a valve box tool 600 and valve box 610, respectively, according to some embodiments. As shown, the valve box 610 may have a plurality of keyways 612 arranged on an upper surface of the valve box, such as around a perimeter of the access opening 614. The valve box tool 600 may have a plurality of keys 602 arranged about a perimeter and configured to align with and engage the plurality of keyways 614. In this way, keys 602 may be configured to be arranged on or over the access opening 612. In other embodiments, other keyway/key configurations may be provided as well.

In use, a valve box of the present disclosure may provide access to a valve, such as a water line valve or a valve for another utility or other line. For example, where the utility or other line is arranged below ground, a valve box of the present disclosure may provide above-ground access to the valve. A valve box tool of the present disclosure, or another tool, may be inserted into and/or through the valve box to reach the valve. Additionally, a valve box of the present disclosure may improve valve operating procedures by providing leverage for operating a valve. For example, where a valve lever or handle needs to be rotated in order to open or close the valve, a valve box of the present disclosure may provide a point of leverage for applying torque to the valve. Particularly, as a tool is used to apply torque to the valve lever or handle, the lever or handle may resist the turning force. Keys along a tool may align with keyways of a valve box to provide leverage for the torque. Moreover, fins arranged on an outer surface of the valve box may help to stabilize the valve box within the ground surface or other surface, so as to mitigate rotation of the valve box itself caused by the torque. This may allow for relatively easier or less labor-intensive valve operations, by generally reducing the manual labor effort needed to operate the valve. That is, the valve box may be used as leverage, rather than an operator laboring to turn the valve manually. A valve box cover of the present disclosure may provide protection for a valve when not being operated.

Additionally, it may be appreciated that threading of the valve box may allow a valve box of the present disclosure to be raised or lowered with respect to a ground surface, by raising or lowering the valve box on a riser, conduit, pipe, or lower valve box to which the box is coupled via the threading. Additionally, as described above, modular rings of a valve box may provide for lengthening or shortening the valve box with relative ease. Such raising/lowering and/or shortening/lengthening operations may be helpful where a valve box experiences shifting due to permafrost or other conditions.

It may be appreciated that a valve box 100 of the present disclosure may be configured to be cut or trimmed without losing functionality. That is, for example, the box housing 102 may be easily trimmed down if needed to accommodate a particular below ground spacing, while still providing keyway 112 engagement for a tool of the present disclosure and threading 118 engagement for coupling to other components. Similarly, a modular valve box of the present disclosure may be shortened or extended without losing functionality of the keyways 112 or threading 118, as each modular section may be configured with the keyways and threading. This may be particularly beneficial in climate where permafrost may cause valve boxes to rise or fall with respect to a ground surface.

Figure 31:
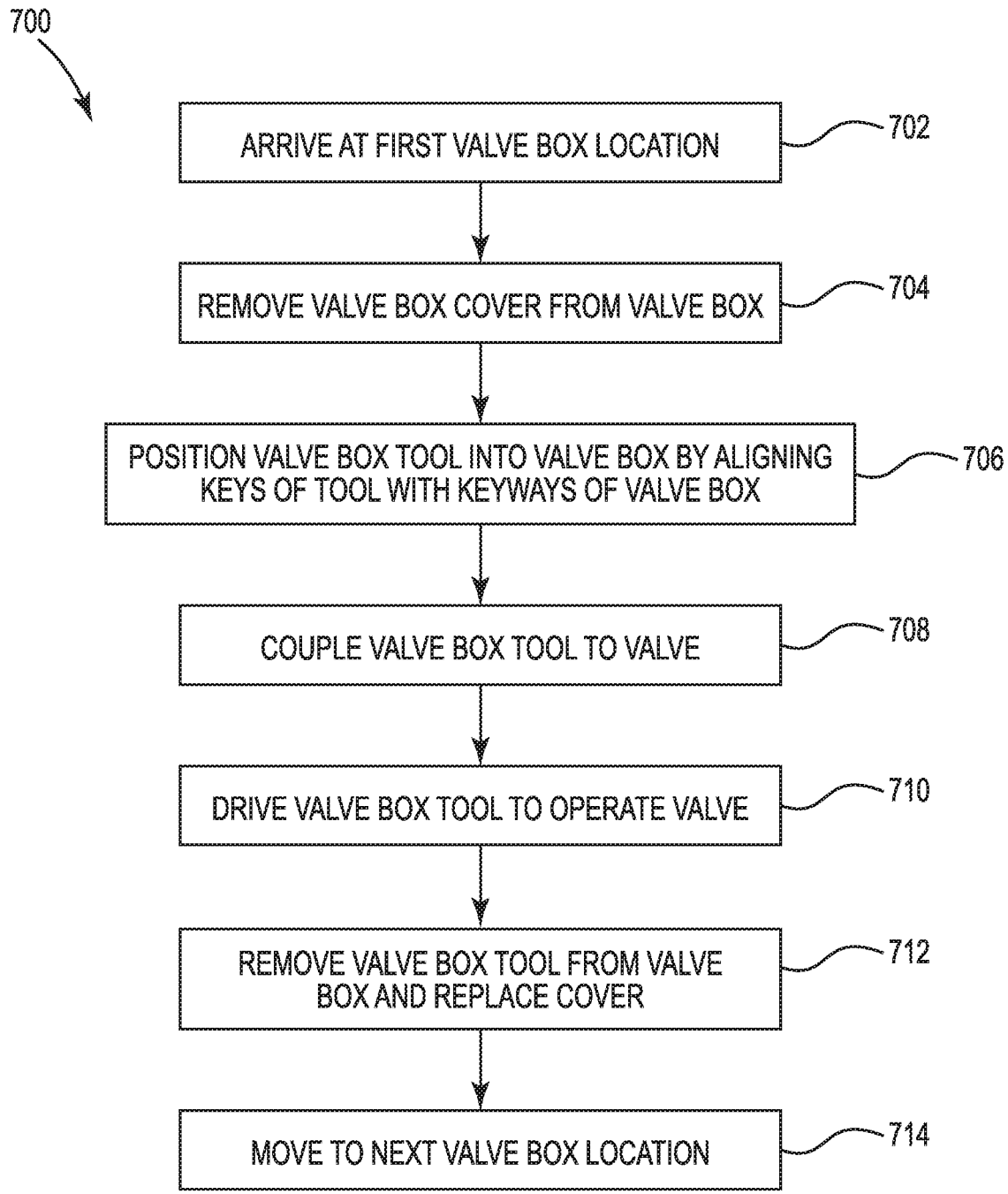
FIG. 31 is a flow diagram of a method of the present disclosure, according to one or more embodiments.

A method of using a valve box tool of the present disclosure with respect to valve boxes of the present disclosure to exercise one or more valves on a utility line is shown in FIG. 31. The method 700 may include arriving at a first valve box location 702; removing a valve box cover from the first valve box 704; positioning a valve box tool into the first valve box by aligning keys of the tool with keyways of the valve box 706; coupling the valve box tool to a valve 708; driving the valve box tool to operate the valve 710; removing the valve box tool from the first valve box and replacing the valve box cover 712; and moving to a next valve box location along the utility line 714. In other embodiments, the method 700 may include additional and/or alternative steps.

The first valve box may be arranged over a first valve with respect to a utility line, such as a water line for example. Arriving at the first valve box location 702 may include, for example driving to the first valve box location. The first valve may be first valve on a particular utility line, where it is desired to open or close each valve along the line, for example. The first valve may be the first physical valve located on the line or may be any valve located along the line that is desired to be opened or closed.

In some embodiments, the first valve box may have a valve box cover. The valve box cover may be removed 704 to access the valve. The valve box cover may be removed by unscrewing the cover, where it is a threaded cover, for example. In other embodiments, the valve box cover may be removed by loosening one or more bolts or screws, undoing one or more fasteners, or otherwise uncovering an access opening of the valve box in order to access the first valve.

A valve box tool having one or more keys configured to engage with one or more keyways of the first valve box may be positioned in the valve box 706. As described above, the valve box tool may be slid into the valve box through the access opening by aligning the keyways and keys, for example. In some embodiments, a surface portion of the valve box tool may be arranged on, over, or through the access opening. In some embodiments, the valve box tool may be coupled to the valve 708. Coupling the valve box tool to the valve may include, for example, extending a stem portion or other portion of the tool through the valve box to reach the first valve positioned below. The stem portion may be configured to engage with a bolt, lever, or other actuator of the valve. The method 700 may further include driving the valve box tool to operate or exercise the valve 710. Driving the valve box tool may include causing a motor, such as an electric motor, to rotate the stem portion, so as to rotate the bolt, lever, or other actuator of the valve.

Once operation or exercise of the first valve is completed, the valve box tool may be removed from the valve box in some embodiments, and the valve box cover may be replaced over the valve box 712. Where the valve box is a first valve box on a utility line, the method 700 may additionally include moving to a next valve box location 714. At the next valve box location, steps 704 through 712 may be generally repeated to operate or exercise the next valve.

Various embodiments of the present disclosure may be described herein with reference to flowchart illustrations and/or block diagrams of methods or apparatus (systems). Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A valve box for accessing a utility valve, the valve box comprising:
   a box housing configured for engaging a riser extending from the utility valve, the box housing having an inner surface and an outer surface both extending about an axis;
   a plurality of fins arranged on the outer surface of the box housing, wherein the fins are configured with a non-circular outwardly-facing profile to resist rotation of the valve box about the axis with respect to a ground surface in contact with the outer surface during turning of the utility valve; and
   a plurality of keyways arranged on the inner surface of the box housing and configured with a non-circular inwardly-facing profile about the axis to receive and engage with a plurality of keys from a valve box tool such that the keys in the keyways provide support in a circumferential direction for turning the utility valve using the valve box tool.

2. The valve box of claim 1, wherein the inner surface further comprises threading.

3. The valve box of claim 1, wherein the plurality of fins comprises at least four fins.

4. The valve box of claim 1, wherein the plurality of keyways comprises at least four keyways.

5. The valve box of claim 1, wherein the box housing further comprises an access opening, and the valve box further comprises a valve box cover configured to be arranged over the access opening.

6. The valve box of claim 5, wherein the valve box cover comprises threading for engaging with the valve box.

7. The valve box of claim 5, wherein the valve box cover comprises an operating nut for engaging with a tool.

8. The valve box of claim 1, wherein the box housing comprises a plurality of modular sections.

9. The valve box of claim 8 wherein each modular section includes a narrowed portion for receiving an adjacent modular section thereover.

10. The valve box of claim 8, wherein each modular section includes one or more female tabs at one end and one or more male tabs at the other end, wherein the female tabs of one modular section engage the male tabs of an adjacent modular section.

11. The valve box of claim 1, wherein the fins extend substantially a full length of the box housing.

12. The valve box of claim 1, wherein the keyways extend substantially a full length of the box housing.

13. The valve box of claim 1, in combination with the valve box tool having the plurality of keys which can be longitudinally positioned in aligned engagement with the plurality of keyways to, when turning the utility valve, transfer resistive force from the utility valve to the valve box.

14. The valve box and valve box tool of claim 13, wherein the valve box tool comprises a gear box comprising at least one gear and providing a torque multiplier.

15. A valve box for accessing a utility valve, the valve box comprising:
- a box housing configured for engaging a riser extending from the utility valve, the box housing having an inner surface and an outer surface both extending about an axis;
- a plurality of fins arranged on the outer surface of the box housing, wherein the fins extend substantially a full length of the box housing, and wherein the fins are configured with a non-circular outwardly-facing profile to resist rotation of the valve box about the axis with respect to a ground surface in contact with the outer surface during turning of the utility valve; and
- a plurality of keyways arranged on the inner surface of the box housing and configured with a non-circular inwardly-facing profile about the axis to receive and engage with a plurality of keys from a valve box tool such that the keys in the keyways provide support in a circumferential direction for turning the utility valve using the valve box tool.

16. A valve box for accessing a utility valve, the valve box comprising:
- a box housing configured for engaging a riser extending from the utility valve, the box housing having an inner surface and an outer surface both extending about an axis;
- threading provided on the inner surface of the box housing;
- a plurality of fins arranged on the outer surface of the box housing, wherein the fins are configured with a non-cylindrical outwardly-facing profile to resist rotation of the valve box about the axis with respect to a ground surface in contact with the outer surface during turning of the utility valve; and
- a plurality of keyways arranged on the inner surface of the box housing and cut at least partially into the threading on the inner surface of the box housing, the keyways being configured with a non-cylindrical inwardly-facing profile about the axis to receive and engage with a plurality of keys from a valve box tool such that the keys in the keyways provide support in a circumferential direction for turning the utility valve using the valve box tool.

* * * * *